(12) United States Patent
Gomez Gutierrez et al.

(10) Patent No.: US 10,564,650 B2
(45) Date of Patent: Feb. 18, 2020

(54) TRAJECTORY TRACKING CONTROLLERS FOR ROTORCRAFT UNMANNED AERIAL VEHICLES (UAVS)

(71) Applicant: Intel Corporation, Santa Clara, CA (US)

(72) Inventors: David Gomez Gutierrez, Tlaquepaque (MX); Maynard C. Falconer, Portland, OR (US); Kirk W. Skeba, Fremont, CA (US); Rodrigo Aldana Lopez, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 15/662,097

(22) Filed: Jul. 27, 2017

(65) Prior Publication Data

US 2019/0033892 A1    Jan. 31, 2019

(51) Int. Cl.
*G05D 1/10* (2006.01)
*B64C 39/02* (2006.01)
*B64D 31/06* (2006.01)

(52) U.S. Cl.
CPC ........... *G05D 1/101* (2013.01); *B64C 39/024* (2013.01); *B64D 31/06* (2013.01); *B64C 2201/042* (2013.01); *B64C 2201/108* (2013.01)

(58) Field of Classification Search
CPC ............... G05D 1/101; B64C 39/024; B64C 2201/042; B64C 2201/108; B64D 31/06
USPC ............................................................. 701/3
See application file for complete search history.

(56) References Cited

U.S. PATENT DOCUMENTS

| 8,019,492 B2* | 9/2011 | Halaas | G05D 1/0061 244/135 A |
| 2012/0095621 A1* | 4/2012 | Zhu | G05D 1/101 701/3 |
| 2017/0088261 A1* | 3/2017 | Sequeira | G01S 13/0209 |

FOREIGN PATENT DOCUMENTS

| WO | WO-2014-198642 | * 12/2014 |
| WO | 2017111971 | 6/2017 |

* cited by examiner

*Primary Examiner* — Muhammad Shafi
(74) *Attorney, Agent, or Firm* — Hanley, Flight & Zimmerman, LLC

(57) ABSTRACT

Apparatus, systems, methods, and articles of manufacture for tracking a trajectory by rotorcraft unmanned aerial vehicles (UAVs) are described herein. An example trajectory tracking controller includes an altitude controller to calculate an output value of a thrust control variable based on a trajectory of a rotorcraft independent of one or more system parameters of the rotorcraft. The example trajectory tracking controller also includes an attitude controller to calculate output values of roll, pitch, and yaw control variables based on the trajectory independent of the one or more of the system parameters. The example trajectory tracking controller further includes a motor speed selector to select speeds for propeller motors of the rotorcraft based on the output values of the thrust, roll, pitch, and yaw control variables and activate the propeller motors based on the selected motor speeds.

15 Claims, 6 Drawing Sheets

TRAJECTORY TRACKING CONTROLLERS FOR ROTORCRAFT UNMANNED AERIAL VEHICLES (UAVS)

FIELD OF THE DISCLOSURE

This disclosure relates generally to unmanned aerial vehicles and, more particularly, to trajectory tracking controllers for rotorcraft unmanned aerial vehicles.

BACKGROUND

Unmanned aerial vehicles (UAVs), commonly referred to as drones, are becoming more readily available and have developed into a rapidly growing market. UAVs are now being used in a wide variety of industries, such as farming, shipping, forestry management, surveillance, disaster scenarios, gaming, etc. In fact, UAVs have even become large enough to carry small payloads. Further, UAVs are now being autonomously controlled to complete a particular mission, such as delivering a package.

Figure 1:
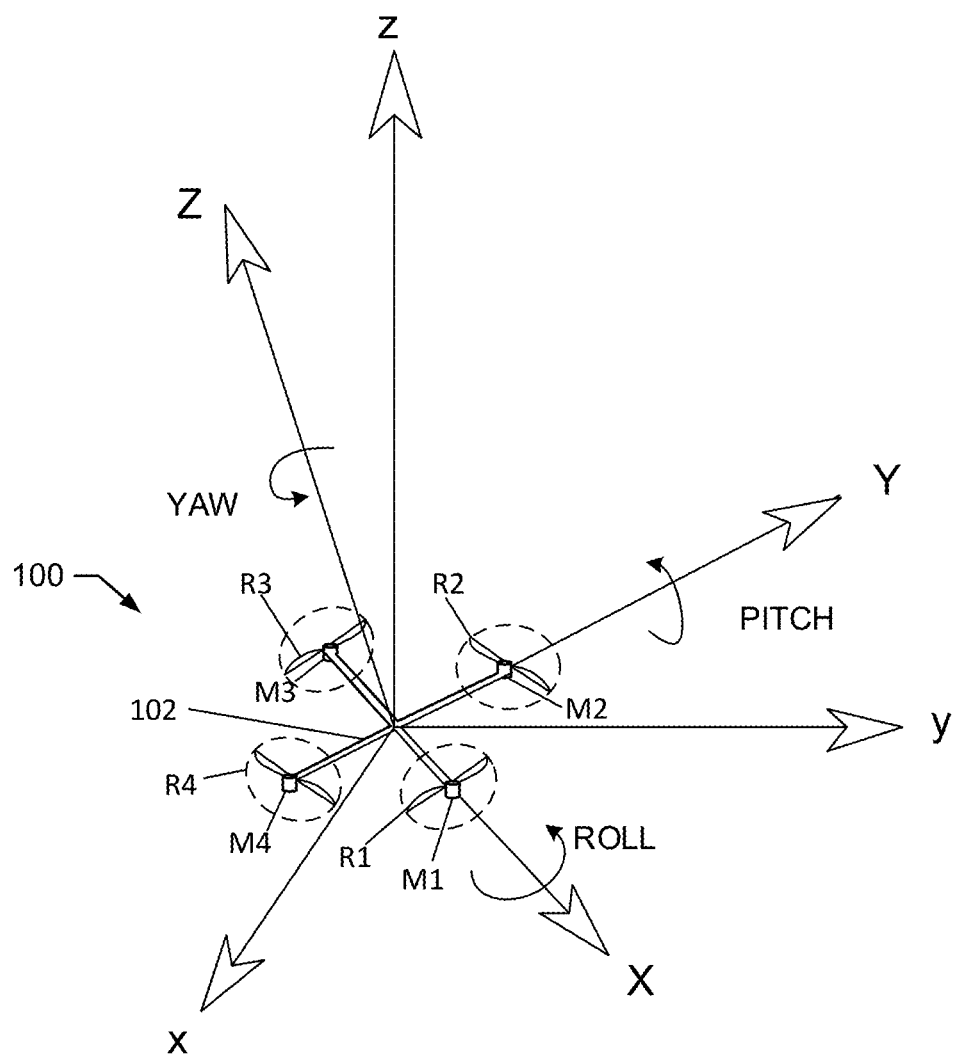
FIG. 1 illustrates an example rotorcraft unmanned aerial vehicle (UAV) in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

A rotorcraft, sometimes referred to as a non-fixed wing aircraft or rotary-wing aircraft, is an aircraft that uses lift generated by one or more propellers or rotor blades. For example, a rotorcraft may include one or multiple rotor blades (e.g., rotor assemblies) mounted on a single mast or multiple masts. Rotorcrafts are a common type of unmanned aerial vehicle (UAV) that use multiple rotor blades, referred to herein as a multi-rotor rotorcraft. For example, a quadcopter UAV is a multi-rotor rotorcraft that generates lift via four rotor blades.

Rotorcraft UAVs are a rapidly growing market and are now being used in all aspects of our world such as for farming, shipping, surveillance, gaming, etc. UAVs are also being used as part of autonomous systems that automatically control the flight of the UAV to perform a particular mission, such as picking up or delivering a package. Trajectory tracking is a key component for autonomous navigation in a complex dynamic environment. Trajectory tracking is the ability to precisely follow a planned or reference trajectory. As used herein, the terms "reference trajectory," "desired trajectory," and "planned trajectory" (and variations thereof) are used interchangeably and are defined to mean an intended or planned path in 3D space as function of time. A planned trajectory may also take into account velocity, acceleration and/or jerk. Trajectory tracking, unlike waypoint navigation, includes the constraint of time. Trajectory tracking is becoming more important today as UAVs are used to perform more complex tasks.

For example, a group of UAVs may be used in a warehouse or factory setting to perform various tasks such as moving objects around the facility. However, following a path without considering time-dependence can lead to collisions. For example, the paths of two UAVs may conflict. Therefore, precisely following an appropriate, time-dependent trajectory ensures no collisions. In such an instance, the conflict can be solved by adjusting the velocity of the planned trajectory of one or both of the UAV S using a trajectory planner. The planned trajectory is often the output of a planning and collision avoidance algorithm. As such, trajectory tracking is advantageous because it includes an extra degree of freedom to increase or decrease speed in the presence of a dynamic object that is on a collision path.

As another example, it is often desired to have a UAV land on a moving object, such as a car or a boat. The dynamic nature of the moving object forces the UAV to calculate a time dependent trajectory and to have a trajectory tracking controller to precisely land on the moving object. Further, in some scenarios, such as outdoor scenarios, there are external disturbances such as wind that can affect the flight behavior of the UAV. Also, in some instances, there may be payload changes that can further affect the flight of the UAV.

Unlike attitude controllers that only stabilize the orientation of a UAV (and are mainly used to be remote controlled by a human pilot), trajectory tracking controllers are used to precisely follow a path as a function of time (e.g., controls both position and orientation). Attitude controllers, such as PID controllers, only control the rotational motion of the UAV and may require trial-and-error tuning. Although an attitude controller may be used to autonomously navigate in 3D space via waypoint navigation, the paths followed are not precise and are not given as a function of time. A trajectory tracking controller, on the other hand, autonomously controls a UAV to fly along a planned trajectory (e.g., provided by a trajectory planner) by generating instructions to control the propeller motors of the UAV based on the current position/orientation of the UAV in reference to the planned trajectory. In particular, trajectory tracking controllers use algorithms or calculations to determine the speed at which to operate each of the propeller motors (based on the desired thrusts) to fly the UAV in accordance with the planned trajectory.

Known methodologies for controlling the autonomous flight of a multi-rotor UAV require a precise modeling and characterization of the UAV system parameters, such as the mass of the UAV (and/or the mass of a payload carried by the UAV), the motor thrusts, moments of inertia of the UAV, the size of the UAV, parameters of the motors such as the drag and thrust coefficients, etc., for the design of the proper controller. In other words, the algorithms and calculations to determine how much thrust to generate are based heavily on the various parameters specific to the UAV. As such, known controllers are tuned specifically based on the system parameters of the respective UAV. Thus, known controllers can only be used for a certain type or model of UAV having the same system parameters. To use a known controller for different UAVs (having different system parameters), a significant amount of time and cost must be incurred to reconfigure, modify, and/or retune the controller to the new system parameters for maintaining precise trajectory tracking capability for autonomous navigation. These issues present significant challenges with the wide use of UAVs.

Also, if one or more of these parameters change, the UAV platform destabilizes and/or performance otherwise degrades. For instance, if the weight of the UAV changes, e.g., by adding a different battery, a camera, a payload, etc., the performance of the UAV may vary (mismatch) greatly from the performance configured by the original precise modeling and characterization of the UAV system parameters. As another example, if the motor parameters (e.g., the thrust and/or drag coefficients) change due to degradation the performance may also greatly vary from the intended performance. This can be detrimental to the flight mission and to the UAV itself (e.g., may cause a collision). Thus, the performance of the UAV degrades without proper (reconfigured) modeling of the new system parameters.

Therefore, known model-based controllers, such a model-based trajectory controllers, differential flatness-based trajectory controllers, and model predictive control-based trajectory controllers all require knowledge of the system parameters. As such, these known trajectory controllers cannot be used to control other UAVs (having different system parameters) without significant tuning of the controller. Further, these known controllers cannot effectively control the trajectory of the UAV if any of the system parameters change during flight (e.g., by changing payloads, degradation of the motors, etc.) without being reconfigured. Also, while these known controllers may be robust to external disturbances (e.g., wind) when the parameters are known, known controllers become inaccurate without the correct system parameters. For instance, known controllers often used inertial measurement unit (IMU)-based approaches to measure and cancel out disturbances through the controller. However, these IMU-based approaches are ineffective under system parameter uncertainty such as where the drag and thrust coefficients of the motors are unknown and/or changing. Some known manufactures have attempted to create controllers that are more robust to parameter variations (which still require knowledge of the changed parameters), but they do no not perform well in the presence of external disturbances. Thus, a tradeoff exists between designing for changes in the system parameters or for external disturbances.

Disclosed herein are example methods, apparatus, systems, and articles of manufacture for controlling trajectory tracking of a rotorcraft (manned or unmanned) that are insensitive to parameter variations and robust to external disturbances. Example methods, apparatus, system, and articles of manufacture disclosed herein may be used to autonomously navigate a rotorcraft UAV without knowledge of the various system parameters used in known controllers, such as the mass of the UAV, the moments of inertia of the UAV, the motor thrusts, the size of the UAV, and the drag and thrust coefficients of the motor. As such, the examples disclosed herein can be easily adapted to control multiple different UAVs having different system parameters with minimal (if any) tuning. Further, by not being heavily dependent on system parameters such as mass, the examples disclosed herein can continue to precisely track a planned trajectory despite changing system parameters (e.g., changing payloads).

Disclosed herein are example trajectory tracking controllers that may be used to autonomously navigate a UAV in accordance with a planned trajectory. Example trajectory tracking controllers disclosed herein may be integrated into the hardware and/or software in the UAV, may be located at a ground station communicating with the UAV, and/or may communicate with the UAV in another manner such as via a network (e.g., the internet). An example trajectory tracking controller disclosed herein calculates control variables (for x, y, z position and yaw $\psi$), which are used to determine the speeds to operate the propeller motors, independent of (without knowledge of) the mass and/or other system parameters of the UAV (such as the moments of inertia, the motor thrusts, etc.). As such, the example controller can be easily adapted to control other types of UAVs having different system parameters (e.g., a heavier or lighter UAV, a UAV with different moments of inertia, etc.) with minimal or no tuning.

In some examples, the example trajectory tracking controller maintains precise navigation by rapidly switching between a plurality of different values for the motor drivers based on the calculated control variables. Each of the values corresponds to one of a plurality of (e.g., eight) different speeds within the motor speed range or spectrum. By increasing and/or decreasing the speeds of the motors rapidly (e.g., at around 1,000 Hertz (Hz)) between these discrete values, the net result is a smooth, linear path that tracks the planned trajectory and which has the same effect on the UAV as a nonlinear trajectory controller having knowledge of the system parameters and measuring external disturbances.

Further, by not using the system parameters in the calculation of the control variables, the example controller can maintain precise navigation of the UAV even when the systems parameters change in flight. For example, if the UAV changes payload (which may change the center of mass of the UAV) during a mission (e.g., picks up a package on the ground or in flight), the example controller continues to accurately control the flight path of the UAV along the planned trajectory, independent of the variation of the weight. As another example, the motor parameters may change due to aging/degrading conditions that generate less thrust over time or by changing the motors in the UAV to more powerful motors (e.g., to generate more thrust) or less powerful motors (e.g., to save battery power). As another example, the moments of inertia may change such as when an irregularly shaped UAV is implemented (e.g., such as a 3D printed UAV made by a hobbyist) or by placing a payload (e.g., a camera) off center. In these examples, the example controller continues to accurately control the flight path of the UAV independent of these variations. Thus, the example controller enables the UAV to fly precisely along the planned trajectory similar to known trajectory controllers that have knowledge of these system parameters.

Still further, example trajectory tracking controllers disclosed herein are robust to external disturbances, such forces caused by wind, storms, thermals, etc., even under parameter uncertainties. The example trajectory tracking controllers are capable of calculating disturbance rejection control laws for cancelling out IMU-based disturbances without knowledge of the system parameters of the UAV. Therefore, unlike known methodologies that lose precision under external disturbances, the example controllers disclosed herein provide precise trajectory tracking even with external disturbances. Thus, the example controllers disclosed herein are capable of robust trajectory tracking (despite external disturbances) in the absence of knowledge of the system parameters, such as mass, motor parameters, moments of inertia, etc.

Also, the example calculations performed by the example trajectory tracking controllers are less complex than known methodologies. As such, the example controllers disclosed herein can also be easily adapted for use with smaller UAVs that typically have reduced computational capabilities. Additionally or alternatively, the example controllers disclosed herein can be used as fail-safe backup controllers for UAVs that typically have greatly reduced computational capabilities. Also, because the example controllers can be applied to various types of UAVs with minimal (if any) tuning, the example controllers can be more easily used by custom made hobbyist UAVs than known controllers that require significant tuning to the system parameters. Thus, the examples disclosed herein may provide a ready-to-fly controller for original equipment manufacturers (OEMs), makers, hobbyists, etc. that can be easily adapted and used for any type of UAV. Furthermore, less time may be incurred developing controllers for different UAVs because the example controllers can be used with a wide range of different UAV, as opposed to known controllers that need to be tuned specifically to the systems parameters of the UAV.

Thus, example trajectory tracking controllers disclosed herein enable precise trajectory tracking that can be used to resolve various challenges in autonomous navigation, such as how to solve conflicting paths in dynamic environments under variable payloads. Further, the example controllers can be used to enable UAVs to land on moving objects (e.g., a moving car, a moving boat, etc.), which is often subject to external disturbances such as wind. The example controllers disclosed herein can also be used to control an onboard gimbal camera to track an object (e.g., a target), for example, in the presence of variations in the UAV orientation and external disturbances. These and many other advantages will be apparent to one of ordinary sill in the art in view of this disclosure.

FIG. 1 illustrates an example UAV 100 in which the examples disclosed herein may be implemented. In the illustrated example, the UAV 100 is a quadcopter rotorcraft have four propeller motors, labeled as M1, M2, M3, M4, for driving four rotor blades R1, R2, R3, R4, respectively, to generate thrust. The motors M1, M2, M3, M4 are carried by a cross airframe or fuselage 102. In general, the motion of a quadcopter can be defined in view of two reference frames: a global reference frame labeled as x, y, z; and a local reference frame (sometimes referred to the UAV or quadcopter reference frame) labeled as X, Y, Z. The global reference frame may be defined by the ground (Earth) or another fixed reference, whereas the local reference frame is the reference frame as seen from the UAV 100 and changes with respect to the global reference frame as the UAV 100 changes position and/or orientation.

In the illustrated example, the X axis of the quadcopter reference frame extends through the first and third motors M1, M3, the Y axis of the quadcopter reference frame extends through the second and fourth motors M2, M4, and the Z axis extends perpendicular to the X and Y axes and through a center of the UAV 100. Assuming, for example, the first motor M1 represents the front of the UAV 100, in this example, roll angle $\phi$ is defined as movement (rotation) about the X axis and is obtained when the balance of thrust from the second and fourth motors M2, M4 is changed (e.g., the speed of the second motor M2 is increased and/or the speed of the fourth M4 is decreased, or vice versa). Therefore, lateral acceleration (e.g., side-to-side movement) is obtained by changing the roll angle $\phi$. Pitch angle $\theta$ is defined as a movement (rotation) about the Y axis and is obtained when the balance of thrust from the first and third motors M1, M3 is changed (e.g., the speed of the first motor M1 is increased and/or the speed of the third motor M3 is decreased, or vice versa). When the pitch angle $\theta$ is changed, forward or backward acceleration is achieved. Yaw angle $\psi$ is defined as a moment (rotation) about the Z axis and is obtained when a combination of the first and third motors M1, M3 change or the second and fourth motors M2, M4 change. As disclosed in further detail herein, these principles and techniques can be used for controlling the orientation and position of the UAV 100 in three-dimensional (3D) space to enable the UAV 100 to acquire and track a reference trajectory in a manner that is insensitive to system parameters and robust to external disturbances in accordance with the teachings of this disclosure.

Figure 2:
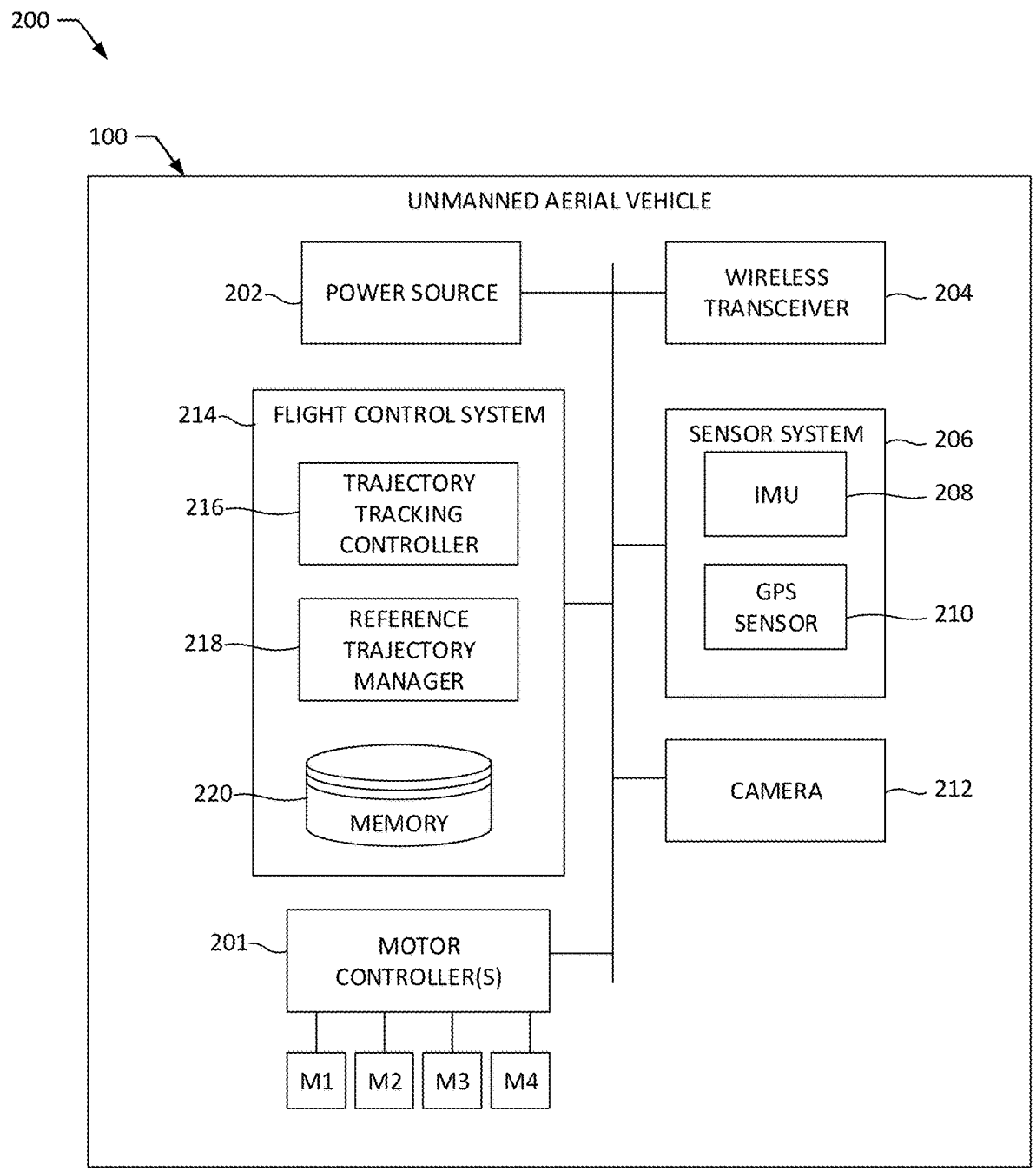
FIG. 2 is a block diagram of an example trajectory tracking system that includes the example rotorcraft UAV of FIG. 1 and an example trajectory tracking controller used to navigate the example rotorcraft UAV along a planned trajectory.

FIG. 2 illustrates a block diagram of an example trajectory tracking system 200 including the example UAV 100. As disclosed above, the example UAV 100 includes four propeller motors M1, M2, M3, M4. The speeds of the motors M1, M2, M3, M4 are controlled by one or more motor controller(s) 201, sometimes referred to a motor driver(s). The motor controller(s) 201 apply power (e.g., via a pulse width modulation (PWM) signal) to control the speeds of the motors M1, M2, M3, M4 and, thus to generate more or less thrust. In this example, the motors M1, M2, M3, M4 are electric motors. However, in other examples, the UAV 100 may include other types of thrust generators (e.g., a fuel powered jet engine) in addition to or as an alternative to the electric motors M1, M2, M3, M4.

In the illustrated example of FIG. 2, the UAV 100 includes a power source 202 to provide power to drive the motors M1, M2, M3, M4 and power the other components of the UAV 100 (e.g., a wireless transceiver 204, a camera 212, etc.). The power source 202 may be, for example, a battery. In other examples, other types of power sources may be implemented. In the illustrated example, the UAV 100 includes the wireless transceiver 204, which operates as a receiver and a transmitter, to communicate wirelessly with a ground controller and/or another component of an aerial system (e.g., an unmanned aerial system (UAS)). The wireless transceiver 204 may be a low frequency radio transceiver, for example. In other examples, other types of transceivers may be implemented.

In the illustrated example, the UAV 100 includes a sensor system 206 including one or more sensors for detecting the orientation, positon, and/or one or more other parameters of the UAV 100. In the illustrated example, the sensor system 206 includes an inertial measurement unit (IMU) 208. The IMU 208 may include one or more sensors that measure linear and/or angular velocities and accelerations to determine orientation, position, velocity and/or acceleration of the UAV 100. For example, the IMU 208 may include a solid-state accelerometer, a gyro, a magnetometer, a static or dynamic pressure sensor, and/or any other IMU. In the illustrated example, the sensor system 206 includes a Global Position System (GPS) sensor 210 to detect GPS signals and determine the position (location), speed and/or acceleration of the UAV 100. In the illustrated example, the UAV 100 also includes the camera 212 that may be used to record images or video. In some examples, the camera 212 may be used as part of the sensor system 206 for determining the positon and/or orientation of the UAV 100. In some examples, the camera 212 is carried by the UAV 100 via a gimbal to enable the camera 212 to turn relative to the UAV 100. In other examples, the UAV 100 may include more or fewer devices.

In the illustrated example, the UAV 100 includes a flight control system 214. The flight control system 214 is configured to control the flight of the UAV 100. In particular, the flight control system 214 sends commands or instructions to the motor controller(s) 201 to control the speeds of the motors M1, M2, M3, M4 accordingly. The flight control system 214 may control the flight of the UAV 100 based on one or more commands from a manual controller, for example, such as a remote control operated by a human pilot.

In the illustrated example, the example trajectory tracking system 200 includes an example trajectory tracking controller 216 constructed in accordance with one or more principles of this disclosure. In the illustrated example, the trajectory tracking controller 216 is implemented as part of the flight control system 214. The example trajectory tracking controller 216 automatically generates instructions to control the speeds of the motors M1, M2, M3, M4 to fly the UAV 100 according to a planned trajectory. In general, the input to the trajectory tracking controller 216 is the planned trajectory and the output of the trajectory tracking controller 216 is the speed or power values for the motors M1, M2, M3, M4. A planned trajectory may be generated and/or otherwise managed by a reference trajectory manager 218 (e.g., a trajectory planner) and may be stored in a memory 220 (e.g., a databse) of the flight control system 214. In some examples, the reference trajectory manager 218 receives a planned trajectory from a remote location, such as a ground station. Additionally or alternatively, the reference trajectory manager 218 may generate a planned trajectory based on one or more input parameters. In some examples, the reference trajectory manager 218 may update, modify and/or otherwise change a planned trajectory based on changes to the mission. The trajectory tracking controller 216 generates instructions to navigate the UAV 100 based a system of equations that compares the position and/or orientation information from the sensor system 206 to the planned trajectory. As disclosed in further detail herein, the example trajectory tracking controller 216 can generate instructions for precisely flying the UAV 100 along a planned trajectory without knowledge of one or more of the various system parameters, such the mass of the UAV 100, the moments of inertia, the motor parameters, and the distance between the propeller motors and the center of mass, which are used in known controllers.

In the illustrated example, the example trajectory tracking controller 216 is part of the flight control system 214 onboard the UAV 100. As such, the trajectory tracking controller 216 is carried by the UAV 100 (e.g., integrated into the hardware of the flight control system 214 of the UAV 100). However, in other examples, the example trajectory tracking controller 216 may be part of a ground station that communicates (e.g., via commands or signals through the wireless transceiver 204) with the UAV 100. Also, while in the illustrated example the trajectory tracking controller 216 operates the motors M1, M2, M3, M4 through the motor controller(s) 201, in other examples, the trajectory tracking controller 216 may incorporate one or more motor controller(s) and/or may otherwise control the motors M1, M2, M3, M4 directly.

Before turning to the details of the example trajectory tracking controller 216 in FIG. 3, a brief description of quadcopter motion and dynamics is provided below. In general, the behavior of a quadcopter, such as the UAV 100, can be represented by the twelve-dimensional mathematical model shown in Tables 1 and 2 below. Table 1 includes the equations for translational movement in 3D space, and Table 2 includes the rotational motion equations that model the orientation of the UAV measured by yaw $\psi$, pitch $\theta$ and roll $\phi$ angles. In Table 1, x, y, z is the position of the UAV 100 in the global reference frame (see FIG. 1, for example), $\dot{x}$, $\dot{y}$, $\dot{z}$ (and, thus, $v_x$, $v_y$, $v_z$) are the velocities of the UAV 100 along the x, y, z axes of the global reference frame, $\dot{v}_x$, $\dot{v}_y$, $\dot{v}_z$ are the linear accelerations along the x, y, z axes of the global reference frame, m is mass of the UAV 100, and g is gravity (9.8 m/s$^2$). Referring to Table 2, $\omega_X$, $\omega_Y$, $\omega_Z$ are the angular velocities on the X, Y, Z axes of the quadcopter (local) reference frame, $\dot{\psi}$, $\dot{\theta}$, $\dot{\phi}$ are the velocities of yaw $\psi$, pitch $\theta$ and roll $\phi$, $\dot{\omega}_X$, $\dot{\omega}_Y$, $\dot{\omega}_Z$ are the angular accelerations on the X, Y, Z axes of the quadcopter reference frame, and $I_X$, $I_Y$, $I_Z$ are the moments of inertia about X, Y, Z axes of the quadcopter reference frame.

TABLE 1

Dynamic of Translational Motion $$\dot{x} = v_x$$
$$\dot{y} = v_y$$
$$\dot{z} = v_z$$

$$\dot{v}_x = -\frac{1}{m}(\cos(\phi)\cos(\psi)\sin(\theta) + \sin(\phi)\sin(\psi))c_T u_T$$

$$\dot{v}_y = -\frac{1}{m}(\cos(\phi)\sin(\theta)\sin(\psi) - \cos(\psi)\sin(\phi))c_T u_T$$

$$\dot{v}_z = g - \frac{1}{m}(\cos(\phi)\cos(\theta))c_T u_T$$

TABLE 2

Dynamic of Rotational Motion $$\dot{\psi} = \frac{\sin(\phi)}{\cos(\theta)}\omega_Y + \frac{\cos(\phi)}{\cos(\theta)}\omega_Z$$

$$\dot{\theta} = \cos(\phi)\omega_Y - \sin(\phi)\omega_Z$$

$$\dot{\phi} = \omega_X + \frac{\sin(\theta)}{\cos(\theta)}\sin(\phi)\omega_Y + \frac{\sin(\theta)}{\cos(\theta)}\cos(\phi)\omega_Z$$

$$\dot{\omega}_X = \frac{I_Y - I_Z}{I_X}\omega_Y\omega_Z + \frac{dc_T}{I_X}u_\phi$$

$$\dot{\omega}_Y = \frac{I_Z - I_X}{I_Y}\omega_X\omega_Z + \frac{dc_T}{I_Y}u_\theta$$

TABLE 2-continued

Dynamic of Rotational Motion $$\dot{\omega}_Z = \frac{I_X - I_Y}{I_Z}\omega_X\omega_Y + \frac{c_Q}{I_Z}u_\psi$$

In Tables 1 and 2 above, $u_T$, $u_\phi$, $u_\theta$, $u_\psi$ are control variables (sometimes referred to as control signals) that are input to the motor controller(s) 201 that are used to determine the speeds to drive the motors M1, M2, M3, M4. The control variables $u_T$, $u_\phi$, $u_\theta$, $u_\psi$ can be found using Equation 1 below:

$$\begin{bmatrix} u_T \\ u_\phi \\ u_\theta \\ u_\psi \end{bmatrix} = \begin{bmatrix} 1 & 1 & 1 & 1 \\ 0 & -1 & 0 & 1 \\ -1 & 0 & 1 & 0 \\ 1 & -1 & 1 & -1 \end{bmatrix} \begin{bmatrix} \overline{\omega}_1^2 \\ \overline{\omega}_2^2 \\ \overline{\omega}_3^2 \\ \overline{\omega}_4^2 \end{bmatrix} \qquad \text{Equation 1}$$

In Equation 1, $\overline{\omega}_1$, $\overline{\omega}_2$, $\overline{\omega}_3$, $\overline{\omega}_4$ are the angular (rotational) speeds of the motors M1, M2, M3, M4, respectively. Each of the control variables $u_T$, $u_\phi$, $u_\theta$, $u_\psi$ corresponds to a unique combination of the angular speeds $\overline{\omega}_1$, $\overline{\omega}_2$, $\overline{\omega}_3$, $\overline{\omega}_4$ (squared) of the motors M1, M2, M3, M4. In particular, by expanding the matrix in Equation 1, the first control variable $u_T$, which represents the total thrust or speed of the motors, is $u_T = \overline{\omega}_1^2 + \overline{\omega}_2^2 + \overline{\omega}_3^2 + \overline{\omega}_4^2$; the second control variable $u_\phi$, which represents the roll torque, is $u_\phi = -\overline{\omega}_2^2 + \overline{\omega}_4^2$; the third control variable $u_\theta$, which represents the pitch torque, is $u_\theta = -\overline{\omega}_1^2 + \overline{\omega}_3^2$; and the fourth control variable, which represents the yaw torque $u_\psi$, is $u_\psi = \overline{\omega}_1^2 - \overline{\omega}_2^2 + \overline{\omega}_3^2 - \overline{\omega}_4^2$.

In Tables 1 and 2, $c_T$ is a thrust coefficient of the motors M1, M2, M3, M4 and represents a proportionality constant between the angular speed of the propeller from a motor (squared) and the force (thrust) it generates. For example, the force (thrust) generated by the propeller (R1) of the first motor M1 is $c_T\overline{\omega}_1^2$. Therefore, the total force obtained by all the motors is $c_Tu_T$. As mentioned above, the second control variable $u_\phi$ (also referred to herein as the roll control variable or roll torque control variable) is the difference between the two angular speeds (squared) of the propellers (R2, R4) of the second and fourth motors M2, M4. As such, $c_Tu_\phi$ is the force difference between the fourth motor M4 and the second motor M2. The torque applied about the axis formed by the second motor M2 and the fourth motor M4, i.e., the X axis from the quadcopter reference frame (see FIG. 1), can be obtained by multiplying the force difference by the distance d between the propellers (i.e., the motors M1, M2, M3, M4) and the center of mass (for a symmetric platform where the propellers are equidistant from the center of mass). Likewise, the same calculation can be performed on third control variable $u_\theta$ (also referred to herein as the pitch control variable or pitch torque control variable) to obtain the torque applied in the axis formed by the first motor M1 and third motor M3, i.e., the Y axis from the quadcopter reference (see FIG. 1). In regards to the fourth control variable $u_\psi$ (also referred to herein as the yaw control variable or yaw torque control variable), another proportionality constant $c_Q$ is used. The proportionality constant $c_Q$ is a drag coefficient for the motors M1, M2, M3, M4. So $c_Qu_\psi$ is the total reaction torque in the axis of rotation of the motors M1, M2, M3, M4, i.e., the Z axis of the quadcopter reference frame (see FIG. 1).

The control variables $u_T$, $u_\phi$, $u_\theta$, $u_\psi$ can be solved for using the equations from Table 2 and used to determine the motor speeds $\overline{\omega}_1$, $\overline{\omega}_2$, $\overline{\omega}_3$, $\overline{\omega}_4$ using Equation 1. As can be seen above from Table 2, in solving for the control variables $u_T$, $u_\phi$, $u_\theta$, $u_\psi$, the control variables $u_T$, $u_\phi$, $u_\theta$, $u_\psi$ are dependent on certain system parameters of the UAV 100, such as the mass m of the UAV 100, the moments of inertia $I_X$, $I_Y$, $I_Z$ of the UAV 100, the thrust and drag coefficients of the motors $c_T$, $c_Q$, and the distance d between the propellers and a center of mass of the UAV 100. Thus, known controllers are typically configured to calculate these control variables $u_T$, $u_\phi$, $u_\theta$, $u_\psi$ based on the fixed system parameters associated with the respective UAV. As disclosed in further detail herein, the example trajectory tracking controller 216 disclosed herein determines output values for the control variables $u_T$, $u_\phi$, $u_\theta$, $u_\psi$ independent of such system parameters. Thus, the example trajectory tracking controller 216 can be implemented with various types of UAVs and/or UAVs with changing system parameters.

Figure 3:
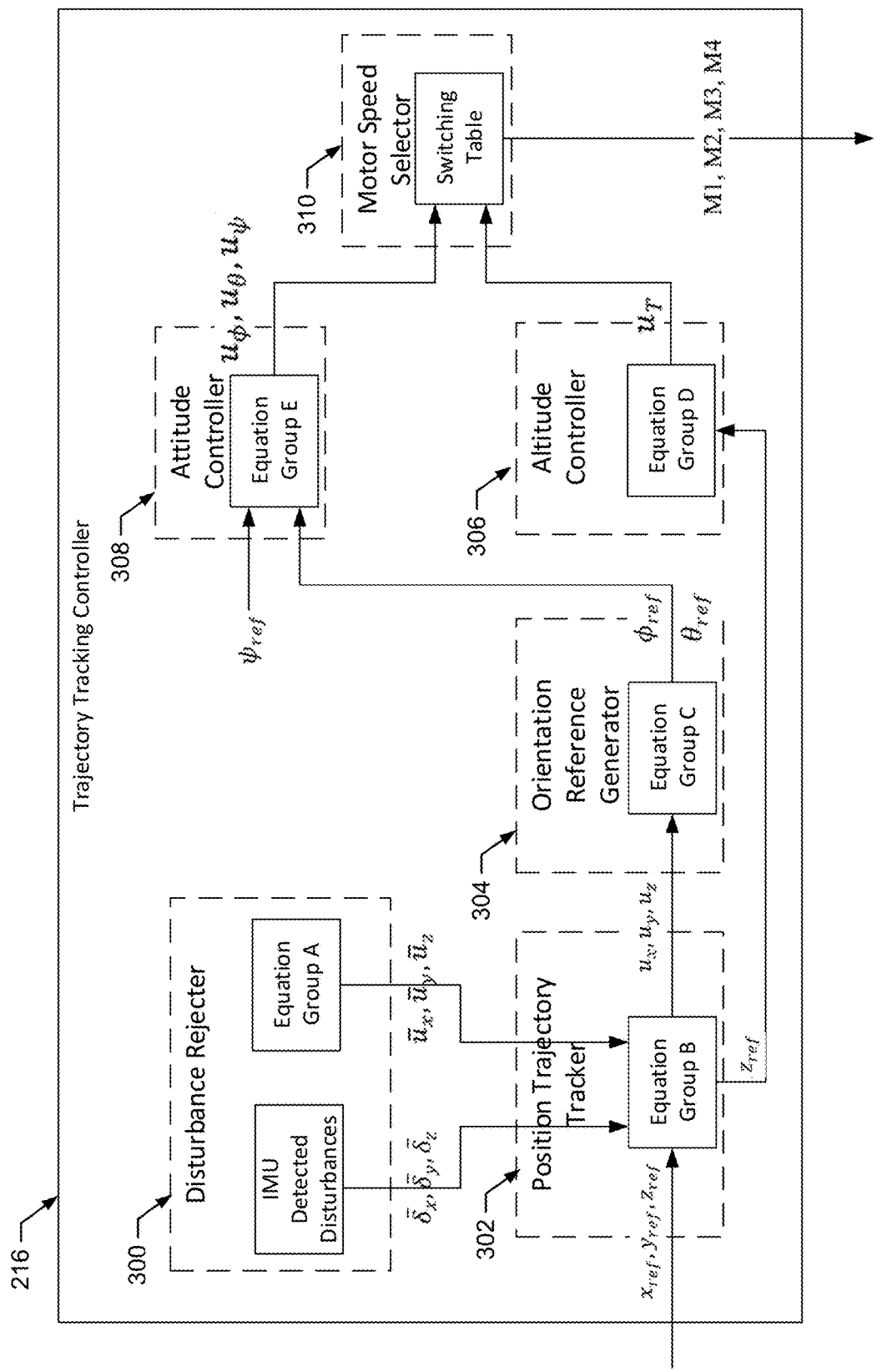
FIG. 3 is an example schematic of the trajectory tracking controller of FIG. 2 that may be used to navigate the example rotorcraft UAV along a planned trajectory.

FIG. 3 is a schematic diagram of the example trajectory tracking controller 216. The trajectory tracking controller 216 calculates values for the control variables $u_T$, $u_\phi$, $u_\theta$, $u_\psi$ independent of one or more system parameters (such as the mass of the UAV 100, the moments of inertia of the UAV 100, motor parameters (e.g., due to motor degradation and/or changes to the motors), size of the UAV 100, etc.), and switches between a plurality of motor speed configurations, based on the control variables $u_T$, $u_\phi$, $u_\theta$, $u_\psi$, to navigate the UAV 100 precisely along the planned trajectory. In the illustrated example of FIG. 3, the trajectory tracking controller 216 includes a disturbance rejecter 300, a position trajectory tracker 302, an orientation reference generator 304, an altitude controller 306, an attitude controller 308, and a motor speed selector 310. The disturbance rejecter 300 compensates for disturbances (e.g., caused by wind, storms, thermals, etc.) that may change the position of the UAV 100 from the planned trajectory. If some of the system parameters (e.g., mass) were known, then the disturbances could be rejected because their effect can be inferred from using the IMU acceleration measurements and compensated using the IMU-based disturbance estimates $\overline{\delta}_x$, $\overline{\delta}_y$, $\overline{\delta}_z$. However, although computationally simple, IMU-based disturbance rejection is challenging under parameter uncertainty. In this example, the disturbance rejecter 300 uses the following Equations 2-4 from Equation Group A below to calculate control laws for disturbance rejection $\overline{u}_x$, $\overline{u}_y$, $\overline{u}z$.

$$\overline{u}_x = \overline{u}_{1,x} \; e_x = x - x_{ref}$$

$$\overline{u}_{1,x} = -\alpha\text{sign}(\dot{e}_x + \beta_1|e_x|^{1/2}\text{sign}(e_x) + \beta_2|\dot{e}_x|^{3/5}\text{sign}(\dot{e}_x) + \beta_3|\ddot{e}_x|^{3/4}\text{sign}(\ddot{e}_x)) \qquad \text{Equation 2}$$

$$\overline{u}_y = \overline{u}_{1,y} \; e_y = y - y_{ref}$$

$$\overline{u}_{1,y} = -\alpha\text{sign}(\dot{e}_y + \beta_1|e_y|^{1/2}\text{sign}(e_y) + \beta_2|\dot{e}_y|^{3/5}\text{sign}(\dot{e}_y) + \beta_3|\ddot{e}_x|^{3/4}\text{sign}(\ddot{e}_y)) \qquad \text{Equation 3}$$

$$\overline{u}_z = \overline{u}_{1,z} \; e_z = z - z_{ref}$$

$$\overline{u}_{1,z} = -\alpha\text{sign}(\dot{e}_z + \beta_1|e_z|^{1/2}\text{sign}(e_z) + \beta_2|\dot{e}_z|^{3/5}\text{sign}(\dot{e}_z) + \beta_3|\ddot{e}_x|^{3/4}\text{sign}(\ddot{e}_z)) \qquad \text{Equation 4}$$

Equation Group A

In Equation Group A, $x_{ref}$, $y_{ref}$, and $z_{ref}$ are the reference signals for the planned trajectory along the x, y, z, axes of the global reference frame, and $\alpha$, $\beta_1$, $\beta_2$, $\beta_3$ are tuning parameters (gains) of the disturbance rejecter 300. The reference signals $x_{ref}$, $y_{ref}$, $z_{ref}$ for the planned trajectory may be provided by the reference trajectory manager 218 (FIG. 2), for example. The reference signals $x_{ref}$, $y_{ref}$, $z_{ref}$ are functions of time. In some examples, the values for the reference signals $x_{ref}$, $y_{ref}$, $z_{ref}$ are read and executed at a desired execution rate, such as about 1,000 Hz. In other examples, the values for reference signals $x_{ref}$, $y_{ref}$, $z_{ref}$ may be read and executed at a higher or lower frequency. In Equation Group A, $e_x$, $e_y$, $e_z$ represent the errors between the current x, y, z position of the UAV 100 and the desired x, y, z positon of the UAV 100. The current x, y, z position of the UAV 100 may be determined using the system sensor system 206 (e.g., the GPS sensor 210), for example. As time passes, the disturbance rejection control laws $\bar{u}_x$, $\bar{u}_y$, $\bar{u}_z$ converge to values that are opposite (e.g., negative) of the disturbance values $\delta_x$, $\delta_y$, $\delta_z$ for the x, y, z, axes and, thus, can be used to reduce or eliminate such disturbances (using Equation Group B disclosed in detail below). As illustrated in FIG. 3, the disturbance rejecter 300 outputs the IMU-based disturbances $\delta_x$, $\delta_y$, $\delta_z$ (e.g., generated by the IMU 208 of FIG. 2) and the disturbance rejection control laws $\bar{u}_x$, $\bar{u}_y$, $\bar{u}_z$ (calculated used Equation Group A) to the position trajectory tracker 302.

In the illustrated example of FIG. 3, the position trajectory tracker 302 computes virtual controls $u_x$, $u_y$, $u_z$ used for the precise trajectory tracking using the disturbance rejection output obtained from the disturbance rejecter 300 and a state feedback using Equations 5-7 from Equation Group B below.

$$u_x = -(\ddot{x}_{ref} + k_1 e_x + k_2 \dot{e}_x + \bar{u}_x + \delta_x)$$ Equation 5

$$u_y = -(\ddot{y}_{ref} + k_1 e_y + k_2 \dot{e}_y + \bar{u}_y + \delta_y)$$ Equation 6

$$u_z = -(\ddot{z}_{ref} + k_1 e_z + k_2 \dot{e}_z + \bar{u}_z + \delta_z)$$ Equation 7

Equation Group B

In Equation Group B, $u_x$, $u_y$, $u_z$ are the virtual controls that represent the required forces along the x, y, z axes in order to track the planned trajectory, $\ddot{x}_{ref}$, $\ddot{y}_{ref}$, $\ddot{z}_{ref}$ are the desired accelerations corresponding to the planned trajectory along the x, y, z axes of the global reference frame, and $k_1$ and $k_2$ are tuning parameters (gains) of the position trajectory tracker 302. The gains ($\alpha$, $\beta_1$, $\beta_2$, $\beta_3$, $k_1$, $k_2$) from Equation Group A and Equation Group B are system-independent and, in some examples, are tuned beforehand. The accelerations $\ddot{y}_{ref}$, $\ddot{y}_{ref}$, $\ddot{z}_{ref}$ are based on (by twice differentiating) the reference signals $x_{ref}$, $y_{ref}$, $z_{ref}$ of the planned trajectory provided by the reference trajectory manager 218 (FIG. 2.). As illustrated in FIG. 3, the position trajectory tracker 302 outputs the virtual controls $u_x$, $u_y$, $u_z$ to the orientation reference generator 304. In the illustrated example, the position trajectory tracker 302 also provides the reference signal $z_{ref}$ to the altitude controller 306. In other examples, the reference signal $z_{ref}$ may be provided directly from the reference trajectory manager 218 (FIG. 2), for example.

In the illustrated example of FIG. 3, the orientation reference generator 304 uses the virtual controls $u_x$, $u_y$, $u_z$ provided by the position trajectory tracker 302 to compute the corresponding roll and pitch reference trajectories $\phi_{ref}$, $\theta_{ref}$ using Equations 8 and 9 of Equation Group C below.

$$\phi_{ref} = \sin^{-1}\left(\frac{u_x \sin(\psi) - u_y \cos(\psi)}{\sqrt{u_x^2 + u_y^2 + u_z^2}}\right)$$ Equation 8

$$\theta_{ref} = \tan^{-1}\left(\frac{u_y \sin(\psi) - u_y \cos(\psi)}{u_z}\right)$$ Equation 9

Equation Group C

In other words, using the required forces $u_x$, $u_y$, $u_z$ in each axis, the desired values of pitch and roll $\phi_{ref}$, $\theta_{ref}$ needed to reach those values can be obtained. If the roll $\phi$ and pitch $\theta$ of the UAV 100 follow these roll and pitch reference trajectories $\phi_{ref}$, $\theta_{ref}$ the trajectory tracking controller 216 can obtain a precise position trajectory tracking. As illustrated in FIG. 3, the roll and pitch reference trajectories $\phi_{ref}$, $\theta_{ref}$ are output to the attitude controller 308, disclosed in further detail below.

In the illustrated example, the altitude controller 306 uses an altitude feedback that ensures a trajectory tracking in the z direction despite mass (and/or other system parameter) uncertainty. In known controllers, the position dynamics depend strongly on the mass of the UAV 100. Although the mass can sometimes be measured beforehand, often there are changes in the mass (e.g., due to payload changes) that can render these dynamics ineffective. Instead, the example altitude controller 306 of FIG. 3 uses an altitude feedback that ensures a trajectory tracking in the z direction, despite mass uncertainty, using the Equation 10 of Equation Group D below.

$$u_T = \begin{cases} 26 & \text{if } v_z - \dot{z}_{ref} + k_3 |z - z_{ref}|^{\frac{1}{2}} \text{sign}(z - z_{ref}) < 0 \\ 10 & \text{otherwise} \end{cases}$$ Equation 10

Equation Group D

In Equation 10, $v_z$ is the velocity of the UAV 100 along the z axis of the global reference frame, $\dot{z}_{ref}$ is the linear velocity along the z axis of the global reference frame given by the desired trajectory, and $k_3$ is a tuning parameter. As can be understood from Equation 10, the thrust control variable $u_T$ is output as either a first (high) value or a second (low) value depending on the outcome of the equation. For example, if the equation is less than zero, then the first (high) value is selected and output. However, if the equation is zero or above, then the second (low) value is selected and output. The first (high) and second (low) output values represent a total of the thrusts from all four motors M1, M2, M3, M4. In this example, the first (high) value is 26, and the second (low) value is 10. However, in other examples, other values may be used for the high and or low values (e.g., 15 and 30, 50 and 100, etc.), and/or the thrust control variable $u_T$ may be divided into more than two output value options (e.g., 10, 15, 20 and 25).

As can be seen above, Equation Group D does not require knowledge of system parameters of the UAV 100, such as the mass, the moments of inertia, the thrust and drag coefficients of the motors, and the distance from the propellers to the center of mass, unlike the methodologies used in known controllers. Thus, the thrust control variable $u_T$ is determined independent of the mass and other system parameters. Nonetheless, the signal of the thrust control variable $u_T$ has the same effect in the system dynamics as if the total thrust applied to the UAV 100 if the mass and motor thrust coefficient were known, as shown in Equation 11 below:

$$u_{T,eq} = \frac{1}{c_T} m \sqrt{u_x^2 + u_y^2 + u_z^2} \qquad \text{Equation 11}$$

Since $u_T$ affects the acceleration in the x and y directions, such control eliminates the dependency on the unknown term $$\frac{1}{c_T} m,$$

which is associated with the mass and the thrust from the rotors (R1, R2, R3, R4). As illustrated in FIG. 3, the altitude controller 306 outputs the output value of the thrust control variable $u_T$ to the motor speed selector 310 and is used to determine the speeds of the motors M1, M2, M3, M4 as disclosed in further detail herein.

In the illustrated example, the attitude controller 308 forces the roll ϕ and pitch θ of the UAV 100 to follow the roll and pitch reference trajectories $\phi_{ref}$, $\theta_{ref}$ (given in Equation Group C) and the yaw ψ to follow a yaw reference trajectory $\psi_{ref}$ given as an input, despite uncertainty on the moment of inertia parameters of the system in the presence of external disturbances. The yaw reference trajectory $\psi_{ref}$ may be provided by a trajectory planner, such as the reference trajectory manager 218 (FIG. 2), and/or from a visual tracking algorithm, for example. A visual tracking algorithm may be used to orient the UAV 100 such that the camera 212 is facing a desired direction during flight (e.g., to film a target object). Yaw ψ is considered independent of the x, y, z position of the UAV 100 so it can be controlled in orient the UAV 100 as desired. The attitude controller 308 calculates the roll, pitch, and yaw control variables $u_\phi$, $u_\theta$, $u_\psi$ using Equations 12-14 of Equation Group E below.

decreased and/or the fourth motor M4 is increased. However, in other examples, other output value options may be implemented (e.g., −5 and 5, −10 and 10, etc.) and/or more output value options may be implemented (e.g., −4, −2, 2, and 4). These control variables $u_{99}$, $u_\theta$, $u_\psi$, which are independent of the system parameters, maintain the orientation of the UAV 100 necessary to maintain the UAV 100 at the desired trajectory. These values, which may be calculated rapidly, result in a trajectory that holds in the desired direction, as disclosed in further detail herein. For example, using the control variable for roll $u_\phi$, the equality of the angular velocity $\omega_x$ holds, as shown in Equation 15 below.

$$\omega_X = -(-\dot{\phi}_{ref} + \tan(\theta)\sin(\theta)\omega_y + \tan(\theta)\cos(\phi)\omega_Z + k_4|\phi - \phi_{ref}|^{1/2}\text{sign}(\phi - \phi_{ref})) \qquad \text{Equation 15}$$

With such behavior on the angular velocity $\omega_x$, the behavior of the roll ϕ becomes as shown in Equation 16 below.

$$\dot{\phi} = \dot{\phi}_{ref} - k_4|\phi - \phi_{ref}|^{1/2}\text{sign}(\phi - \phi_{ref})$$

Using control theory, it can be verified that the roll ϕ converges to the roll reference trajectory $\phi_{ref}$ (the trajectory desired to track the planned trajectory in 3D space). The same can be verified for pitch θ and yaw ψ. Thus, the example control variables $u_\phi$, $u_\theta$, $u_\psi$ can be used to control the roll ϕ, pitch θ, and yaw ψ for precisely tracking the planned trajectory independent of the system parameters of the UAV 100, such as the mass of the UAV 100, the moments of inertia of the UAV 100, the drag and thrust coefficients of the motors M1, M2, M3, M4, and the distance between the motors and the center of mass of the UAV 100. As illustrated in FIG. 3, the attitude controller 308 outputs the output values of the control variables $u_\phi$, $u_\theta$, $u_\psi$ to the motor speed selector 310 and is used to determine speeds of the motors M1, M2, M3, M4.

In the illustrated example, the motor speed selector 310 uses the control variables $u_T$, $u_\phi$, $u_\theta$, $u_\psi$ calculated using Equation Group D and Equation Group E to select between different motor speeds configurations for the motors M1, M2, M3, M4 (each row representing a different motor speed configuration). In particular, the motor speed selector 310

$$u_\phi = \begin{cases} 2 & \omega_X + \left(-\dot{\phi}_{ref} + \tan(\theta)\sin(\phi)\omega_Y + \tan(\theta)\cos(\phi)\omega_Z + k_4|\phi - \phi_{ref}|^{\frac{1}{2}}\text{sign}(\phi - \phi_{ref})^{f()}\right) < 0 \\ -2 & \text{otherwise} \end{cases} \qquad \text{Equation 12}$$

$$u_\theta = \begin{cases} 2 & \omega_Y + \frac{1}{\cos(\phi)}\left(-\dot{\theta}_{ref} - \text{sign}(\phi)\omega_Z + k_4|\theta - \theta_{ref}|^{\frac{1}{2}}\text{sign}(\theta - \theta_{ref})\right) < 0 \\ -2 & \text{otherwise} \end{cases} \qquad \text{Equation 13}$$

$$u_\psi = \begin{cases} 2 & \omega_Z + \frac{\cos(\theta)}{\cos(\phi)}\left(-\dot{\psi}_{ref} + \frac{\sin(\phi)}{\cos(\theta)}\omega_Y + k_4|\psi - \psi_{ref}|^{\frac{1}{2}}\text{sign}(\psi - \psi_{ref})\right) < 0 \\ -2 & \text{otherwise} \end{cases} \qquad \text{Equation 14}$$

Equation Group E

As seen in Equation Group E above, each of the control variables $u_\phi$, $u_\theta$, $u_\psi$ is output as either a positive value (e.g., torque in a positive direction) or a negative value (e.g., torque in a negative direction), depending on the result of the respective equation. In this example, output values of the control variables are 2 or −2, where 2 represents in a bias in one direction, and −2 represents a bias in the opposite direction. For example, $u_\phi = 2$ may indicate a roll in one direction where the second motor M2 is increased and/or the fourth motor M4 is decreased, and $u_\phi = -2$ may indicate a roll in the other direction where the second motor M2 is uses an example switching table (which may be referred to as a motor speed configuration table), such as Table 3 below.

TABLE 3

| $u_T$ | $u_\phi$ | $u_\theta$ | $u_\psi$ | | Motor 1 | Motor 2 | Motor 3 | Motor 4 |
|---|---|---|---|---|---|---|---|---|
| 10 | −2 | −2 | −2 | → | 3 | 4 | 1 | 2 |
| 10 | −2 | −2 | 2 | → | 4 | 3 | 2 | 1 |
| 10 | −2 | 2 | −2 | → | 1 | 4 | 3 | 2 |
| 10 | −2 | 2 | 2 | → | 2 | 3 | 4 | 1 |
| 10 | 2 | −2 | −2 | → | 3 | 2 | 1 | 4 |
| 10 | 2 | −2 | 2 | → | 4 | 1 | 2 | 3 |

TABLE 3-continued

| $u_T$ | $u_\phi$ | $u_\theta$ | $u_\psi$ | | Motor 1 | Motor 2 | Motor 3 | Motor 4 |
|---|---|---|---|---|---|---|---|---|
| 10 | 2 | 2 | −2 | → | 1 | 2 | 3 | 4 |
| 10 | 2 | 2 | 2 | → | 2 | 1 | 4 | 3 |
| 26 | −2 | −2 | −2 | → | 7 | 8 | 5 | 6 |
| 26 | −2 | −2 | 2 | → | 8 | 7 | 6 | 5 |
| 26 | −2 | 2 | −2 | → | 5 | 8 | 7 | 6 |
| 26 | −2 | 2 | 2 | → | 6 | 7 | 8 | 5 |
| 26 | 2 | −2 | −2 | → | 7 | 6 | 5 | 8 |
| 26 | 2 | −2 | 2 | → | 8 | 5 | 6 | 7 |
| 26 | 2 | 2 | −2 | → | 5 | 6 | 7 | 8 |
| 26 | 2 | 2 | 2 | → | 6 | 5 | 8 | 7 |

As can be seen from Table 3, the motor speeds for each motor M1, M2, M3, M4 are selected from a number of values representing discrete speeds or intensity values from the motor input range (e.g., a total motor speed range or spectrum). For example, in Table 3, the motor speeds are selected from eight (8) values, where 1 represents the lowest selectable speed value and 8 represents the highest selectable speed value. An example correlation may include: 1=10%, 2=15%, 3=20%, 4=25%, 5=75%, 6=80%, 7=85%, and 8=90%, where the percentages correspond to a duty cycle of the pulse-width modulation (PWM) signal that is used for powering the respective motors M1, M2, M3, M4, for example. These correlations are selected such that the speed values of 1, 2, 3, 4 are equally separated from the values for 5, 6, 7, 8, respectively (e.g., by 65%). In the example Table 3, the speed values for the motors M1, M2, M3, M4 are different than each other for each motor speed configuration.

As can be seen above in Table 3, the speeds values of 1, 2, 3, 4 are used for the lower thrust value (10) of the thrust control variable $u_T$, and the speed values of 5, 6, 7, 8 are used for the higher thrust value (26) of the thrust control variable $u_T$. Thus, in this example, there are eight different motor speed configurations to produce a low thrust (10), and eight different motor speed configuration to produce a high thrust (26), which can be used to affect the speed in the z direction. Each configuration is dependent on the combination of the output values for the control variables $u_T$, $u_\phi$, $u_\theta$, $u_\psi$. The total thrust for each of the low thrust combinations is 10, and the total thrust for each of the high thrust combinations is 26. Thus, the total thrusts for the configurations can be maintained. For example, if the thrust control variable $u_T$ is 10, and the roll, pitch, and yaw control variables $u_\phi$, $u_\theta$, $u_\psi$, are −2, then the motor speed selector 310 selects the motor speed configuration in the first row of Table 3, where M1 is 3, M2 is 4, M3 is 1, and M4 is 2 and, thus, the thrust is 10. In such an example, the first motor M1 is activated at 20%, the second motor M2 is activated at 25%, the third motor M3 is activated at 10%, and the fourth motor M4 is activated at 15%. As another example, if the thrust control variable $u_T$ is 10, and the roll, pitch, and yaw control variables $u_\phi$, $u_\theta$, $u_\psi$, are −2, −2, 2, respectively, then the motor speed selector 310 selects the motor speed configuration in the second row of Table 3, where M1 is 4, M2 is 3, M3 is 2, and M4 is 1, and, thus, the total thrust is also 10.

The altitude controller 306 and the attitude controller 308 rapidly calculate and recalculate (update) the values of the control variables $u_T$, $u_\phi$, $u_\theta$, $u_\psi$, and, in response, the motor speed selector 310 quickly changes the speeds of the motors M1, M2, M3, M4 based on the output values (e.g., high or low, positive or negative, etc.) of the control variables $u_T$, $u_\phi$, $u_\theta$, $u_\psi$. By rapidly switching between the different motor speed configuration (different speeds for the motors M1, M2, M3, M4), the resulting flight path is a smooth, linear flight path flown by the UAV 100 along the desired trajectory. In some examples, the control variables $u_T$, $u_\phi$, $u_\theta$, $u_\psi$, are calculated at a relatively high frequency, such as around 1,000 Hz. As such, the motor speeds can also be switched (e.g., between intensities 1-8) at a relatively high frequency. As such, the trajectory tracking controller 216 is constantly checking and changing the speeds of the motors M1, M2, M3, M4 at relatively fast, small increments that results in a flight path along the desired trajectory and does so without the need of the system parameters of the UAV 100. In other examples, the control variables $u_T$, $u_\phi$, $u_\theta$, $u_\psi$, and/or the motor speeds may be calculated at a higher frequency (e.g., 1,500 Hz) or a lower frequency (e.g., 750 Hz). In some examples, the control variables $u_T$, $u_\phi$, $u_\theta$, $u_\psi$, and/or the motor speeds are calculated and adjusted at a frequency of at least 500 Hz.

As can be seen by the equations above, the calculations of the control variables $u_T$, $u_\phi$, $u_\theta$, $u_\psi$, and the selections of the motors speeds are independent of (not based on) the system parameters that are used in known controllers. In particular, the equations in Equation Groups A-E do not take into account mass (m), moments of inertia ($I_X$, $I_Y$, $I_Z$), thrust and drag coefficients of the motors ($c_T$, $c_Q$), and the distance (d) from the propellers to the center of mass, which are used in the equations of Tables 1 and 2. As such, the same calculations and controls can be used to control a UAV having a different system parameters than the UAV 100. Even though the thrusts generated by different UAVs may vary, the thrusts are proportional to each respective UAV and are compensated for by using a plurality of discrete values (e.g., 1-8) from the motor speed input. Further, even if one or more of the system parameters of the UAV 100 changes such as, for example, by adding a heavier payload, the example trajectory tracking controller 216 can continue to precisely track the planned trajectory (e.g., by selecting a motor speed configuration with a higher thrust for a longer duration of the trajectory). The system parameters may change for a variety of reasons. For example, the motors may degrade with time, which can affect the thrust and drag motor coefficients. As another example, a user (e.g., a pilot) may modify the UAV 100 in one or more of the following ways, for example: by adding a camera or other sensors that change the mass of the platform; by changing one or more of the motors to more powerful motors to increase lifting capability; by changing one or more of the motors to less powerful (e.g., lighter) motors to increase battery autonomy; by adding one or more batteries to increase the autonomy; by increasing the number of motors (e.g., to convert from a quadcopter to a hexacopter); by adding a case (e.g., a 3D printed case that looks like a spaceship), which may affect the center of mass; and/or by adding protections to increase safety. In other examples, the system parameters may be change for different reasons. Instead of using the mass and other system parameters like known controllers, the example trajectory tracking controller 216 makes relatively fast, small changes to the speeds of the motors (based on changes between the current x, y, z position of the UAV 100 and the reference signals $x_{ref}$, $y_{ref}$, $z_{ref}$ from the planned trajectory) independent of these system parameters. As such, the example trajectory tracking controller 216 can continue to effectively operate to track the UAV 100 along a planned trajectory while advantageously enabling such changes to be made to the UAV platform.

As illustrated in FIG. 3, the example trajectory tracking controller 216 utilizes the six modules or controllers 300-310 to provide precise trajectory tracking that is robust to external disturbance and agnostic of system parameters (e.g., mass, inertia, size, etc.). In other examples, the example trajectory tracking controller 216 may utilize less than all six of the example modules 300-310. In other words, the example trajectory tracking controller 216 can be used to calculate the control variables independent of one or more (e.g., all) of the system parameters. In some examples, if some of the system parameters (e.g., moments of inertia, the thrust and/or drag coefficients of the motors, etc.) are known, some of the modules 300-310 can be simplified or replaced by other computations. Thus, the modular design enables the trajectory tracking controller 216 to lead to less complex configurations when some parameters are known.

The example motor speed configuration Table 3 can be generated using the matrix from Equation 1 and the output values from the control variables $u_T$, $u_\phi$, $u_\theta$, $u_\psi$. For example, the speeds $\bar{\omega}_1$, $\bar{\omega}_2$, $\bar{\omega}_3$, $\bar{\omega}_4$ for the motors M1, M2, M3, M4 can be determined using Equation 17 below (which is the inverse of Equation 1).

$$\begin{bmatrix} M_1 \\ M_2 \\ M_3 \\ M_4 \end{bmatrix} = \begin{bmatrix} 1 & 1 & 1 & 1 \\ 0 & -1 & 0 & 1 \\ -1 & 0 & 1 & 0 \\ 1 & -1 & 1 & -1 \end{bmatrix}^{-1} \begin{bmatrix} u_T \\ u_\phi \\ u_\theta \\ u_\psi \end{bmatrix} = \begin{bmatrix} 0.25 & 0 & -0.5 & 0.25 \\ 0.25 & -0.5 & 0 & -0.25 \\ 0.25 & 0 & 0.5 & 0.25 \\ 0.25 & 0.5 & 0 & -0.25 \end{bmatrix} \begin{bmatrix} u_T \\ u_\phi \\ u_\theta \\ u_\psi \end{bmatrix}$$

Equation 17

By expanding the matrix in Equation 17, it can be seen that the speed values for motors M1, M2, M3, and M4 can be calculated as follows:

$M1 = 0.25u_T - 0.5u_\theta + 0.25u_\psi$ $M2 = 0.25u_T - 0.5u_\phi - 0.25u_\psi$ $M3 = 0.25u_T + 0.5u_\theta + 0.25u_\psi$ $M4 = 0.25u_T + 0.5u_\phi - 0.25u_\psi$ Thus, the values for M1, M2, M3, M4 can be calculated once the output values for the control variables $u_T$, $u_\phi$, $u_\theta$, $u_\psi$ are known. For example, assuming the results of the control variables $u_T$, $u_\phi$, $u_\theta$, $u_\psi$ correspond to the first motor speed configuration where $u_T = 10$, $u_\phi = -2$, $u_\theta = -2$, and $u_\psi = -2$, then the speed values for M1, M2, M3, M4 can be calculated as follows:

$M1 = 0.25(10) - 0.5(-2) + 0.25(-2) = 3$ $M2 = 0.25(10) - 0.5(-2) - 0.25(-2) = 4$ $M3 = 0.25(10) + 0.5(-2) + 0.25(-2) = 1$ $M4 = 0.25(10) + 0.5(-2) - 0.25(-2) = 2$

Thus, the motor speed configuration table can be generated by inputting the different combinations of possible output values for the control variables $u_T$, $u_\phi$, $u_\theta$, $u_\psi$. While in this example the matrix equation is associated with the orientation of the X, Y, Z axes of the local reference frame shown in FIG. 1, in other examples, the orientation of the X, Y, Z axes may be different. For example, the X axis may extend between the first and second motors M1, M2 and between the third and fourth motors M3, M4, and the Y axis may extend between the first and fourth motors M1, M4 and between the second and third motors M2, M3. In such example, a different matrix equation may be used that correlates the control variables $u_T$, $u_\phi$, $u_\theta$, $u_\psi$ to the proper motor speeds to generate the desired flight path.

In some examples, the motor speed configuration table is generated beforehand and stored in the memory 220 of the flight control system 214. In other examples, the motor speed selector 310 may generate the table once knowing the number of rotors or motors of the UAV 100 and the numbers of speed values to use. For example, during an initial use or calibration of the trajectory tracking controller 216, a user may input the number of motors of the UAV 100. In some examples, the controller 216 may automatically determine the number of motors of a UAV such as by detecting a mechanical connection of the motors to the motor controller(s) (e.g., the motor controller(s) 201 (FIG. 2)). For example, a Universal Serial Bus (USB) may detect the connection using a pair of resistors (one for each of the connections). In some examples, adding one or more motors is performed before taking off, so the trajectory tracking controller 216 may be preconfigured to the number of motors when connecting the motors to the trajectory tracking controller 216. Depending on the number of propeller motors, a different speed configuration table can be generated or selected. For example, a UAV having a six propeller motors may have a different motor speed configuration table that accounts for the various combinations of output values for the control variables $u_T$, $u_\phi$, $u_\theta$, $u_\psi$. In other examples, the memory 220 may store a plurality of tables for different rotor configurations (e.g., 4 rotors, 6 rotors, 8 rotors, etc.) and, based on the number of rotors, the motor speed selector 310 may select the corresponding table to use. For example, in an instance where the trajectory tracking controller 216 is part of a ground station, the trajectory tracking controller 216 may synchronize with a UAV and obtain information from the UAV about the number of rotors the UAV has. Then, the motor speed selector 310 may generate and/or select the appropriate table corresponding to the number of rotors of the UAV.

While in the example above, the motor speed configuration table is already generated and can be used to identify a particular motor speed configuration (and, thus, motor speeds) based on the output values for the control variables $u_T$, $u_\phi$, $u_\theta$, $u_\psi$, in other examples, the motor speed selector 310 may instead calculate (and recalculate) the motor speed values using Equation 17 above each time the output values for the control variables $u_T$, $u_\phi$, $u_\theta$, $u_\psi$ are calculated, which results in the same effect. However, in some examples, using such a table may decrease the computational power to implement the motor speed selector 310, which may be advantageous in smaller UAVs with lower computational capabilities, for instance.

Below is an example process to generate a motor speed configuration table, such as Table 3 above. First, it is decided how many output value options are used for the thrust control variable $u_T$ and for each of the roll, pitch, and yaw torque variables $u_\phi$, $u_\theta$, $u_\psi$. For example, the thrust control variable $u_T$ is to be selected between a high output value ($a_{T,Low}$) and a low output value ($a_{T,Low}$), and the roll, pitch, and yaw torque variables $u_\phi$, $u_\theta$, $u_\psi$ are to be selected between a positive output value ($+a_\phi$, $+a_\theta$, $+a_\psi$) and a negative output value output value ($-a_\phi$, $-a_\theta$, $-a_\psi$). Thus, in this example, the output values for each of the control variables is one of two output values. The number of output value options may be decided and input by a user, for example. Based on the number of rotors (e.g., four with a quadcopter) and the set of desired values (two for each variable), there are 16 combinations. The combinations of the high and low output values for thrust control variable $u_T$ and the positive and negative output values for the roll, pitch, and yaw control variables $u_\phi$, $u_\Theta$, $u_\psi$ can be used to fill out the first four columns on the left in Table 3, for example. Then, using Equation 1 (or Equation 17) above and working backwards, the output values (for each of the thrust, roll, pitch, torque, and yaw control variables $u_T$, $u_\phi$, $u_\Theta$, $u_\psi$) can be solved for knowing that there are two values (a high and a low) for the thrust control variable $u_T$ and two output values (a positive and a negative) for each of the roll, pitch, and yaw torque variables $u_\phi$, $u_\Theta$, $u_\psi$. Then, the output values are used in the different combinations (motor speed configurations) to solve for the motor speed values. In this example, the calculations result in eight (8) motor speed values (e.g., 1-8). The motor speed values may be correlated to specific levels within the motor speed input range. These motor speeds can then be input into the four right columns in Table 3 for the appropriate motors M1, M2, M3, M4 for each of the 16 combinations. In other examples, instead of having only two output options (high and low) for the thrust control variable $u_T$, there could be three or more output values (a high, a medium, a low, etc.). Likewise, instead of only a single positive and negative output value for the roll, pitch, and yaw control variables $u_\phi$, $u_\Theta$, $u_\psi$, there could be two or more positive values and/or two or more negative values. Using different numbers of values results in a different number of combinations and, thus a different number of discrete motor speed values. In some examples, using a higher number of output values can be used to finer control of the thrust, roll, pitch, and yaw control dynamics, for example.

While an example manner of implementing the example trajectory tracking controller 216 of FIG. 2 is illustrated in FIG. 3, one or more of the elements, processes and/or devices illustrated in FIG. 3 may be combined, divided, re-arranged, omitted, eliminated and/or implemented in any other way. Further, the example disturbance rejecter 300, the example position trajectory tracker 302, the example orientation reference generator 304, the example altitude controller 306, the example attitude controller 308, the example motor speed selector 310, and/or, more generally, the example trajectory tracking controller 216 of FIG. 3 may be implemented by hardware, software, firmware and/or any combination of hardware, software and/or firmware. Thus, for example, any of the example disturbance rejecter 300, the example position trajectory tracker 302, the example orientation reference generator 304, the example altitude controller 306, the example attitude controller 308, the example motor speed selector 310, and/or, more generally, the example trajectory tracking controller 216 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example disturbance rejecter 300, the example position trajectory tracker 302, the example orientation reference generator 304, the example altitude controller 306, the example attitude controller 308, and/or the example motor speed selector 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example trajectory tracking controller 216 of FIG. 3 may include one or more elements, processes and/or devices in addition to, or instead of, those illustrated in FIG. 3, and/or may include more than one of any or all of the illustrated elements, processes and devices.

Figure 4:
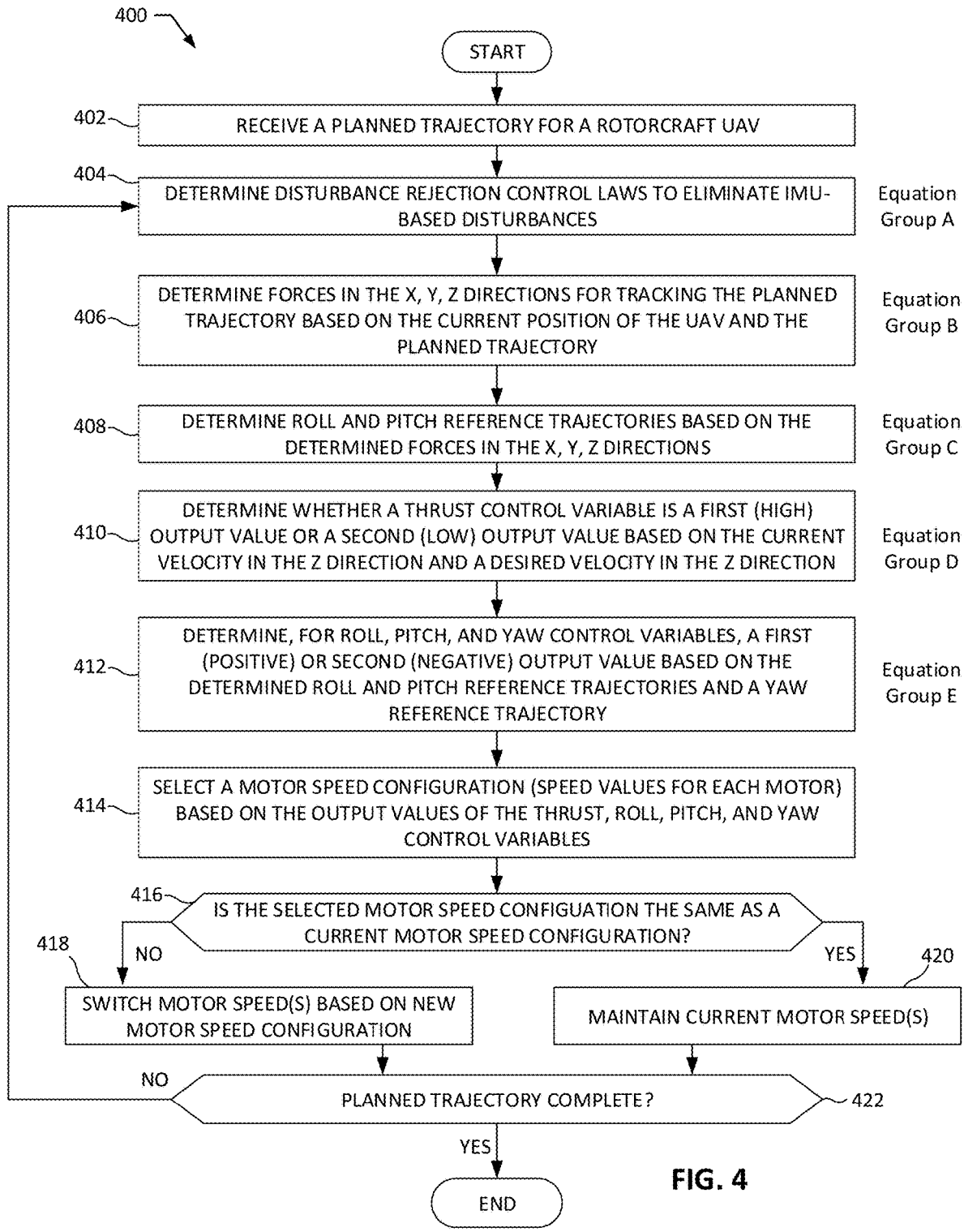
FIG. 4 is a flowchart representative of example machine readable instructions that may be executed by the example trajectory tracking controller of the example trajectory tracking system of FIG. 3 to navigate the example UAV along a planned trajectory.
Figure 5:
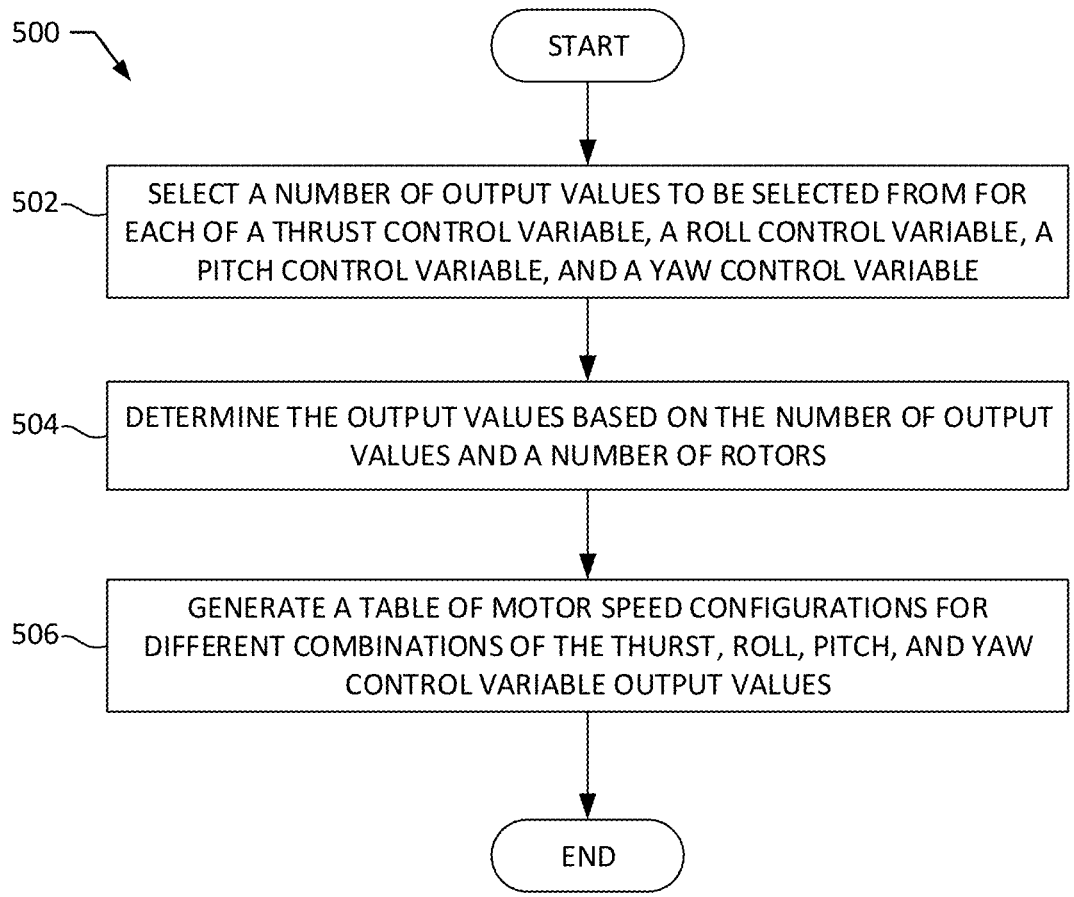
FIG. 5 is a flowchart representative of example machine readable instructions that may be executed by the example trajectory tracking controller of FIG. 3 to generate an example motor speed configuration table for use in navigating the example rotorcraft UAV along a planned trajectory.

Flowcharts representative of example machine readable instructions for implementing the example trajectory tracking controller 216 of FIG. 3 are shown in FIGS. 4 and 5. In these examples, the machine readable instructions comprise a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and 5, many other methods of implementing the example trajectory tracking controller 216 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4 and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 4 is a flowchart 400 representative of example machine readable instructions that may be implemented by the example trajectory tracking controller 216 of FIG. 3 to navigate a rotorcraft UAV, such as the UAV 100, in accordance with a planned trajectory. At block 402, the example trajectory tracking controller 216 receives the planned trajectory for the UAV 100. For example, the trajectory tracking controller 216 may receive the planned trajectory from the reference trajectory manager 218 (FIG. 2) in the form of the reference signals $x_{ref}$, $y_{ref}$, $z_{ref}$. The reference signals $x_{ref}$, $y_{ref}$, $z_{ref}$ may be provided at a desired execution rate, such as about 1,000 Hz, for example.

At block 404, the disturbance rejecter 300 determines the disturbance rejection control laws $\bar{u}_x, \bar{u}_y, \bar{u}_z$ (which can be used to eliminate the IMU-based disturbance values $\bar{\delta}_x, \bar{\delta}_y, \bar{\delta}_z$) using Equation Group A. Thus, in some examples, the disturbance rejecter 300 provides means for determine one or more disturbance rejection control laws $\bar{u}_x, \bar{u}_y, \bar{u}_z$ based on the current x, y, z position of the UAV 100 and the desired position (via the $x_{ref}, y_{ref}, z_{ref}$ reference signals) of the planned trajectory. At block 406, the position trajectory tracker 302 determines the forces in the x, y, z directions (of the global reference frame) for tracking the planned trajectory based on the current x, y, z position of the UAV 100 (e.g., from the GPS sensor 210) using Equation B. For example, as shown in Equation Group B, the position trajectory tracker 302 calculates the virtual controls $u_x, u_y, u_z$ using the outputs from the disturbance rejecter 300 (e.g., the IMU-based disturbances $\bar{\delta}_x, \bar{\delta}_y, \bar{\delta}_z$ and the disturbance rejection control laws $\bar{u}_x, \bar{u}_y, \bar{z}_z$) as well as the state feedback (the accelerations $\ddot{x}_{ref}, \ddot{y}_{ref}, \ddot{z}_{ref}$ corresponding to the planned trajectory along the x, y, z axes of the global reference frame). Thus, in some examples, the position trajectory tracker 302 provides means for determining forces to be generated along the x, y, z axes by the UAV 100 to follow the planned trajectory based on the current x, y, z position of the UAV 100 and the desired position (via the $x_{ref}, y_{ref}, z_{ref}$ reference signals) of the planned trajectory.

At block 408, the orientation reference generator 304 determines the roll and pitch reference trajectories $\phi_{ref}, \theta_{ref}$ based on the determined forces (e.g., the control variables $u_x, u_y, u_z$) in the x, y, z directions using Equation Group C. Thus, in some examples, the orientation reference generator 304 provides means for determining a roller reference trajectory $\phi_{ref}$ and a pitch reference $\theta_{ref}$ trajectory to be performed to navigate the UAV 100 along a planned trajectory. At block 410, the altitude controller 306 determines whether the thrust control variable $u_T$ is a first (high) output value or a second (low) output value based on the current velocity $v_z$ in the z direction (e.g., determined using the sensor system 206) and the desired velocity $\dot{z}_{ref}$ in the z direction (e.g., based on information provided by the position trajectory tracker 302) using Equation Group D. For example, using Equation Group D above, the altitude controller 306 determines the thrust control variable $u_T$ to be either 26 or 10. Thus, in some examples, the altitude controller 306 provides means for calculating or determining an output value of a thrust control variable $u_T$ based on a planned trajectory of the UAV 100. As disclosed herein, the calculation of the output value of the thrust control variable $u_T$ is independent of the system parameters of the UAV 100, including the mass of the UAV 100, the moments of inertia of the UAV 100, the drag coefficient of the motors M1, M2, M3, M4, the thrust coefficient of the motors M1, M2, M3, M4, and the distance between the motors M1, M2, M3, M4 and a center of mass of the UAV 100.

At block 412, the attitude controller 308 determines, for the roll, pitch, and yaw control variables $u_\phi, u_\theta, u_\psi$, a first (positive) or a second (negative) output value based on the determined roll and pitch reference trajectories $\phi_{ref}, \theta_{ref}$ and the yaw reference trajectory $\psi_{ref}$ using Equation Group E. For example, as seen in Equation Group E above, the roll, pitch, and yaw control variables $u_\phi, u_{74}, u_\psi$, are determined to be either 2 or −2. Thus, in some examples, the attitude controller 308 provides means for calculating or determining output values of roll, pitch, and yaw control variables based on a planned trajectory of the UAV 100. Similar to the calculation of the thrust control variable $u_T$, the calculations of the output values for roll, pitch, and yaw control variables $u_\phi, u_\theta, u_\psi$, are independent of the system parameters of the UAV 100, including the mass of the UAV 100, the moments of inertia of the UAV 100, the drag coefficient of the motors M1, M2, M3, M4, the thrust coefficient of the motors M1, M2, M3, M4, and the distance between the motors M1, M2, M3, M4 and a center of mass of the UAV 100.

At block 414, the motor speed selector 310 selects a motor speed configuration based on the output values of the control variables $u_T, u_\phi, u_\theta, u_\psi$. For example, using the example Table 3 above, the motor speed selector 310 determines the motor speed configuration corresponding to the combination of output values for the control variables $u_T, u_\phi, u_\theta, u_\psi$. The motor speeds for each motor M1, M2, M3, M4 are selected from a number of values representing discrete speeds or intensity values from the motor input range (e.g., a total motor speed range or spectrum) such as, for example, 1=10%, 2=15%, 3=20%, 4=25%, 5=75%, 6=80%, 7=85%, and 8=90%. Thus, the motor speed selector 310 provides means for selecting motor speeds for the motors M1, M2, M3, M4 of the UAV 100 based on the output values of the control variables $u_T, u_\phi, u_\theta, u_\psi$. In some examples, instead of using a motor speed configuration table, the motor speed selector 310 may calculate the motor speed values using Equation 17 based on the output values of the control variables $u_T, u_\phi, u_\theta, u_\psi$, for example.

At block 416, the motor speed selector 310 determines if the selected motor speed configuration is the same as a current motor speed configuration. In other words, the motor speed selector 310 determines whether the motors M1, M2, M3, M4 are already currently operating at the selected speeds. In some examples, the motor speed selector 310 determines the current motor speeds based on a signal from the motor controller(s) 201 (FIG. 2) and/or a previously calculated/stored motor speed configuration. If the motor speeds of the selected motor speed configuration are different than the current motor speeds, the motor speed selector 310, at block 418, sends a command signal to the motor controller(s) 201 to change the speed of the motors M1, M2, M3, M4 accordingly. The trajectory tracking controller 216 and/or the motor controller(s) 201 activate the motors M1, M2, M3, M4 at the selected motor speeds. Thus, trajectory tracking controller 216 and/or the motor controller(s) 201 provide means for activating the motors M1, M2, M3, M4 based on the selected motor speeds. If the motor speeds are the same, the motor speed selector 310, at block 420, does not send a command signal or sends a command signal to maintain the current motor speeds. In such an example, the motor speeds are not changed.

At block 422 of FIG. 4, the trajectory tracking controller 216 determines if the planned trajectory is complete. If not, control returns to block 404. In such an example, the calculations using Equations Groups A-E are again computed to determine the outputs of the control variables $u_T, u_\phi, u_\theta, u_\psi$, for selecting or identifying the motors speeds. This process may occur rapidly at a relatively high frequency, such as about 1,000 Hz. In other words, the process of calculating the control variables, selecting the motor speeds, and/or activating the motors may occur at a frequency of about 1,000 Hz. In other examples, a higher or lower frequency may be used. In some examples, the trajectory tracking control 216 operates a frequency of at least about 500 Hz, which may produce effective control to navigate the UAV 100 along the planned trajectory. By changing the motor speeds rapidly between the different motor speed levels, the resulting trajectory is a smooth, linear path that follows the planned trajectory. Otherwise, if the planned trajectory is complete (determined at block 422), the example process of FIG. 4 ends.

FIG. 5 is a flowchart 500 representative of example machine readable instructions that may be implemented by the motor speed selector 310 of the trajectory tracking controller 216 to generate an example motor speed configuration table, such as Table 3 above. At block 502, the motor speed selector 310 selects or receives (e.g., via user input) a number of output values to be selected from for each of the thrust control variable $u_T$, the roll control variable $u_\phi$, the pitch control variable $u_\theta$, and the yaw control variable $u_\psi$. For instance, in one of the examples above, two output values (e.g., a high value and a low value) are selected for the thrust control variable $u_T$ and two values (e.g., a positive value and a negative value) are selected for each of the roll, pitch, and yaw control variables $u_\phi$, $u_\theta$, $u_\psi$. In other examples, the number of output values for the thrust control variable $u_T$ can be more than two (e.g., three, such as a low thrust, a medium thrust, and a high thrust) and/or the number of output values for the roll, pitch, and yaw control variables $u_\phi$, $u_\theta$, $u_\psi$ can include different numbers of positive and negative output values (e.g., two positive output values and two negative output values).

At block 504, the motor speed selector 310 determines the output values based on the number of output values for the thrust, roll, pitch, and yaw control variables $u_T$, $u_\phi$, $u_\theta$, $u_\psi$ and the number of rotors. In the example of Table 3, for example, there were 16 combinations, which resulted in a high output value of 26 for the thrust control variable $u_T$, a low output value of 10 for the thrust control variable $u_T$, and a positive output value of 2 and negative output value of −2 for each of the roll, pitch, and yaw control variables $u_\phi$, $u_\theta$, $u_\psi$.

At block 506, the motor speed selector 310 generates a table of motor speed configurations for different combinations of the output values for the thrust, roll, pitch, and yaw control variables $u_T$, $u_\phi$, $u_\theta$, $u_\psi$. For example, the motor speed selector 310 may use Equation 17 above with the various combinations of the control variables $u_T$, $u_\phi$, $u_\theta$, $u_\psi$ (e.g., first combination is 10, −2, −2, −2, second combination is 10, −2, −2, 2, and so forth). Each combination of the output values results in different speed values for the motors M1, M2, M3, M4. For instance, in Table 3 above, the combinations of the output values results in eight speed values (1-8). In some examples, the motor speed selector 310 correlates these speed values to specific levels within the motor speed input range, where 1 is the lowest, 2 is the second lowest, and so forth. For example, 1=10%, 2=15%, 3=20%, 4=25%, 5=75%, 6=80%, 7=85%, and 8=90%. Additionally or alternatively, user input may be used to correlate the speed values to the levels in the motor speed input range. After generating the table, the example process of FIG. 5 ends. The example table may be used, for example, in block 414 of FIG. 4.

Figure 6:
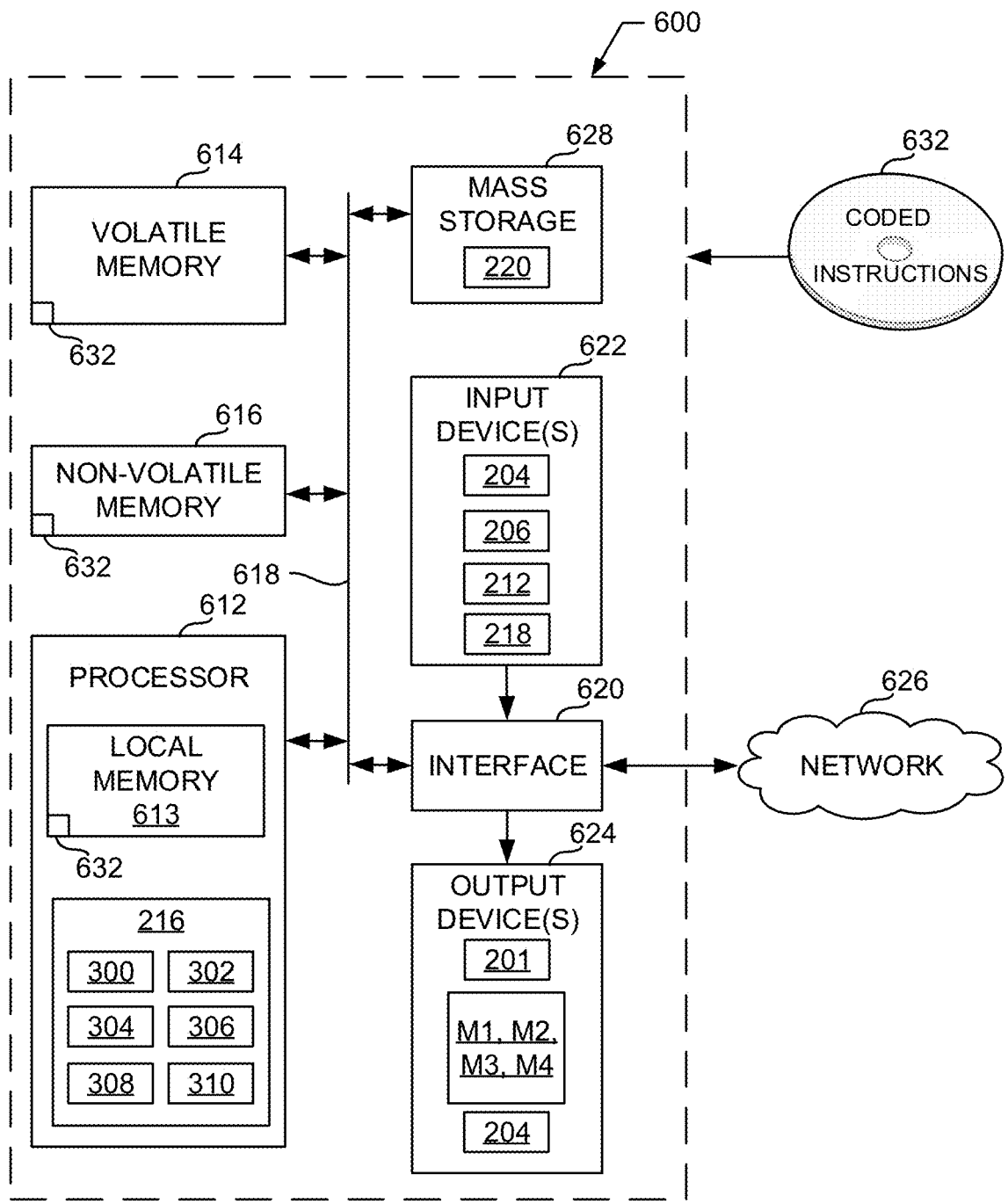
FIG. 6 is a processor platform that may execute the example instructions of FIGS. 4 and 5 to implement the example trajectory tracking controller of FIG. 3.

FIG. 6 is a block diagram of an example processor platform 600 capable of executing the instructions of FIGS. 4 and 5 to implement the example trajectory tracking controller 216 of FIGS. 2 and 3. The processor platform 600 can be, for example, a server, a personal computer, an embedded device, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor may be a semiconductor based (e.g., silicon based) device. In this example, the processor 612 may implement the disturbance rejecter 300, the position trajectory tracker 302, the orientation reference generator 304, the altitude controller 306, the attitude controller 308, the motor speed selector 310, and/or, more generally, the trajectory tracking controller 216.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device(s) 622 may include, for example, the wireless transceiver 204, the sensor system 206 (including the IMU 208 and/or the GPS sensor 210), the camera 212, and/or the reference trajectory manager 218.

One or more output devices 624 are also connected to the interface circuit 620 of the illustrated example. The output device(s) 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip and/or a graphics driver processor. In this example, the output device(s) 624 may include, for example, the motor controller(s) 201, the motors M1, M2, M3, M4, and/or the wireless transceiver 204.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives. In this example, the mass storage 628 may include, for example, the memory 220.

Coded instructions 632 of FIGS. 4 and 5 may be stored in the mass storage device 628, in the volatile memory 614, in the non-volatile memory 616, and/or on a removable tangible computer readable storage medium such as a CD or DVD.

From the foregoing, it will be appreciated that example methods, apparatus, systems, and articles of manufacture have been disclosed that control a rotorcraft, such as a quadcopter UAV, to fly precisely along a planned trajectory without knowledge of the system parameters, including the mass of the rotorcraft, the moments of inertia of the rotorcraft, the drag and thrust coefficients of the propeller motors, and the distance between the propeller motors and the center of mass of the rotorcraft. As such, example methods, apparatus, systems, and articles of manufacture disclosed herein can be easily adapted to be used with different rotorcraft having different system parameters, such as different sizes, weights, payloads, etc. Further, example methods, apparatus, systems, and articles of manufacture disclosed herein can be used while one or more of the system parameters (e.g., mass) change throughout the planned trajectory, unlike known trajectory controllers that are heavily dependent on fixed system parameters. While the examples disclosed herein are described in connection with an unmanned aircraft, the example techniques can also be implemented with a manned rotorcraft.

Example methods, apparatus, systems and articles of manufacture to track a trajectory by a rotorcraft unmanned aerial vehicle are disclosed herein. Further examples and combinations thereof include the following:

Example 1 includes a trajectory tracking system including a rotorcraft having a plurality of propeller motors and a trajectory tracking controller to determine speeds for the propeller motors to navigate the rotorcraft along a trajectory. The trajectory tracking controller includes an attitude controller to calculate output values of roll, pitch, and yaw control variables, an altitude controller to calculate an output value of a thrust control variable, and a motor speed selector to select speeds for the propeller motors based on the output values of the thrust, roll, pitch, and yaw control variables. The calculations of the output values of the thrust, roll, pitch, and yaw control variables are independent of one or more system parameters of the rotorcraft.

Example 2 includes the system of Example 1, wherein the system parameters include at least one of a mass of the rotorcraft, moments of inertia of the rotorcraft, a drag coefficient of the propeller motors, a thrust coefficient of the propeller motors, or a distance between the propeller motors and a center of mass of the rotorcraft.

Example 3 includes system of Example 2, wherein the calculations of the output values of the thrust, roll, pitch, and yaw control variables are independent of the mass of the rotorcraft, the moments of inertia of the rotorcraft, the drag coefficient of the propeller motors, the thrust coefficient of the propeller motors, and the distance between the propeller motors and the center of mass of the rotorcraft.

Example 4 includes the system of any of Examples 1-3, wherein the motor speed selector is to select the speeds for the propeller motors using a table having a plurality of motor speed configurations. The motor speed configurations correspond to different combinations of the output values of the thrust, roll, pitch, and yaw control variables.

Example 5 includes the system of Example 4, wherein, for each of the motor speed configurations, each of the speeds is different.

Example 6 includes the system of Example 4, wherein the motor speed selector is to select the speeds from a plurality of discrete speed values for each of the propeller motors.

Example 7 includes the system of Example 6, wherein the motor speed selector is to select the speeds from eight speed values for each of the propeller motors.

Example 8 includes the system of any of Examples 1-3, wherein the output values of the thrust, roll, pitch, and yaw controls variables are one of two output values.

Example 9 include the system of any of Examples 1-3, wherein the attitude controller is to recalculate the output values for the roll, pitch, and yaw control variables and the altitude controller is to recalculate the output value of the thrust control variable at a frequency of at least about 500 Hertz (Hz).

Example 10 includes system of any of Examples 1-3, wherein the trajectory tracking controller further includes an orientation reference generator to determine a roll reference trajectory and a pitch reference trajectory to be performed to navigate the rotorcraft along the trajectory. The attitude controller is to calculate the output value of the roll control variable based on the roll reference trajectory and calculate the output value of the pitch control variable based on the pitch reference trajectory.

Example 11 includes the system of Example 10, wherein the attitude controller is to calculate the output value of the yaw control variable based on a yaw reference trajectory.

Example 12 includes the system of Example 10, wherein the trajectory tracking controller further includes a position trajectory tracker to determine, based on a current position of the rotorcraft and a desired position of the trajectory, forces to be generated along x, y, z axes by the rotorcraft to follow the trajectory. The orientation reference generator is to determine the roll reference trajectory and the pitch reference trajectory based on the forces to be generated along the x, y, z axes.

Example 13 includes the system of Example 12, wherein the altitude controller is to calculate the thrust control variable based on a z reference signal of the desired position of the trajectory.

Example 14 includes the system of Example 12, wherein the rotorcraft includes an inertial measurement unit, and the trajectory tracking controller further includes a disturbance rejecter to determine, based on the current position of the rotorcraft and the desired position of the trajectory, one or more disturbance rejection control laws. The position trajectory tracker is to determine the forces along the x, y, z axes by eliminating disturbances from the inertial measurement unit based on the disturbance rejection control laws.

Example 15 includes the system of any of Examples 1-3, wherein the trajectory tracking controller is carried by the rotorcraft.

Example 16 includes the system of any of Examples 1-3, wherein the trajectory tracking controller is remote to the rotorcraft.

Example 17 includes the system of Example 16, wherein the rotorcraft includes a wireless transceiver to communicate with the trajectory tracking controller.

Example 18 includes the system of any of Examples 1-3, wherein the rotorcraft is an unmanned aerial vehicle.

Example 19 includes the system of any of Examples 1-3, wherein the rotorcraft is a quadcopter.

Example 20 includes a non-transitory machine readable storage medium including instructions that, when executed, cause a machine to at least calculate output values for thrust, roll, pitch, and yaw control variables based on a trajectory of a rotorcraft independent of one or more system parameters of the rotorcraft, select motor speeds for propeller motors of the rotorcraft based on the output values for the thrust, roll, pitch, and yaw control variables, and activate the propeller motors based on the selected motor speeds.

Example 21 includes the non-transitory machine readable storage medium of Example 20, wherein the system parameters include at least one of a mass of the rotorcraft, moments of inertia of the rotorcraft, a drag coefficient of the propeller motors, a thrust coefficient of the propeller motors, or a distance between the propeller motors and a center of mass of the rotorcraft.

Example 22 includes the non-transitory machine readable storage medium of Example 21, wherein the instructions, when executed, cause the machine to calculate the output values of the thrust, roll, pitch, and yaw control variables independent of the mass of the rotorcraft, the moments of inertia of the rotorcraft, the drag coefficient of the propeller motors, the thrust coefficient of the propeller motors, and the distance between the propeller motors and the center of mass of the rotorcraft.

Example 23 includes the non-transitory machine readable storage medium of any of Examples 20-22, wherein the motor speeds are selected from a table of a plurality of motor speed configurations. The motor speed configurations correspond to different combinations of the output values of the thrust, roll, pitch, and yaw control variables.

Example 24 includes the non-transitory machine readable storage medium of Example 23, wherein, for each of the motor speed configurations, each of the motor speeds is different.

Example 25 includes the non-transitory machine readable storage medium of Example 23, wherein the motor speeds are selected from a plurality of discrete speed values for each of the propeller motors.

Example 26 includes the non-transitory machine readable storage medium of Example 25, wherein the motor speeds are selected from eight discrete speed values for each of the propeller motors.

Example 27 includes the non-transitory machine readable storage medium of any of Examples 20-22, wherein each of the thrust, roll, pitch, and yaw control variables are one of two output values.

Example 28 includes the non-transitory machine readable storage medium of any of Examples 20-22, wherein the instructions, when executed, further cause the machine to recalculate the output values of the thrust, roll, pitch, and yaw control variables, select the motor speeds, and activate the propeller motors at a frequency of at least about 500 Hertz (Hz).

Example 29 includes the non-transitory machine readable storage medium of any of Examples 20-22, wherein the instructions, when executed, further cause the machine to determine a roll reference trajectory and a pitch reference trajectory to be performed to navigate the rotorcraft along the trajectory. The calculation of the output value of the roll control variable is based on the roll reference trajectory and the calculation of the output value of the pitch control variable is based on the pitch reference trajectory.

Example 30 includes the non-transitory machine readable storage medium of Example 29, wherein the instructions, when executed, cause the machine to calculate the output value of the yaw control variable based on a yaw reference trajectory.

Example 31 includes the non-transitory machine readable storage medium of Example 29, wherein the instructions, when executed, further cause the machine to determine, based on a current position of the rotorcraft and a desired position of the trajectory, forces to be generated along x, y, z axes by the rotorcraft to follow the trajectory. The determination of the roll reference trajectory and the pitch reference trajectory are based on the forces to be generated along the x, y, z axes.

Example 32 includes the non-transitory machine readable storage medium of Example 31, wherein the instructions, when executed, cause the machine to calculate the thrust control variable based on a z reference signal of the desired position of the trajectory.

Example 33 includes the non-transitory machine readable storage medium of Example 31, wherein instructions, when executed, further cause the machine to determine, based on the current position of the rotorcraft and the desired position of the trajectory, one or more disturbance rejection control laws. The calculation of the forces to be generated along the x, y, z axes uses the disturbance rejection control laws to eliminate disturbances from an inertial measurement unit of the rotorcraft.

Example 34 includes a trajectory tracking controller including means for calculating an output value of a thrust control variable based on a trajectory of a rotorcraft independent of one or more system parameters of the rotorcraft, means for calculating output values of roll, pitch, and yaw control variables based on the trajectory independent of the one or more of the system parameters, means for selecting motor speeds for propeller motors of the rotorcraft based on the output values of the thrust, roll, pitch, and yaw control variables, and means for activating the propeller motors based on the selected motor speeds.

Example 35 includes the controller of Example 34, wherein the system parameters include at least one of a mass of the rotorcraft, moments of inertia of the rotorcraft, a drag coefficient of the propeller motors, a thrust coefficient of the propeller motors, or a distance between the propeller motors and a center of mass of the rotorcraft.

Example 36 includes the controller of Example 35, wherein the output values of the thrust, roll, pitch, and yaw control variables are calculated independent of the mass of the rotorcraft, the moments of inertia of the rotorcraft, the drag coefficient of the propeller motors, the thrust coefficient of the propeller motors, and the distance between the propeller motors and the center of mass of the rotorcraft.

Example 37 includes the controller of any of Examples 34-36, wherein the means for selecting is to select the motor speeds from a table of a plurality of motor speed configurations. The motor speed configurations corresponding to different combinations of the output values of the thrust, roll, pitch, and yaw control variables.

Example 38 includes the controller of Example 37, wherein, for each of the motor speed configurations, each of the motor speeds is different.

Example 39 includes the controller of Example 37, wherein the motor speeds are selected from a plurality of discrete speed values for each of the propeller motors.

Example 40 includes the controller of Example 39, wherein the motor speeds are selected from eight discrete speed values for each of the propeller motors.

Example 41 includes the controller of any of Examples 34-36, wherein each of the thrust, roll, pitch, and yaw control variables are one of two output values.

Example 42 includes the controller of any of Examples 34-36, wherein the means for calculating the output value of the thrust control variable and the means for calculating the output values of the roll, pitch, and yaw control variables are to recalculate the output values for the thrust, roll, pitch, and yaw control variables, respectively, the means for selecting is to select the motor speeds, and the means for activating is to activate the propeller motors at a frequency of at least about 500 Hertz (Hz).

Example 43 includes the controller of any of Examples 34-36, further including means for determining a roll reference trajectory and a pitch reference trajectory to be performed to navigate the rotorcraft along the trajectory. The means for calculating the output values of the roll, pitch, and yaw control variables is to calculate of the output value of the roll control variable based on the roll reference trajectory and calculate the output value of the pitch control variable based on the pitch reference trajectory.

Example 44 includes the controller of Example 43, wherein the means for calculating the output values of the roll, pitch, and yaw control variables is to calculate the output value of the yaw control variable based on a yaw reference trajectory.

Example 45 includes the controller of Example 43, further including means for determining forces to be generated along x, y, z axes by the rotorcraft to follow the trajectory based on a current position of the rotorcraft and a desired position of the trajectory. The means for determining the roll reference trajectory and the pitch reference trajectory is to determine the roll reference trajectory and the pitch reference trajectory based on the forces to be generated along the x, y, z axes.

Example 46 includes the controller of Example 45, wherein the means for calculating the output value of the thrust control variable is to calculate the output value of the thrust control variable based on a z reference signal of the desired position of the trajectory.

Example 47 includes the controller of Example 45, further including means for determining one or more disturbance rejection control laws based on the current position of the rotorcraft and the desired position of the trajectory. The means for determining the forces to be generated along the x, y, z axes uses the disturbance rejection control laws to eliminate disturbances from an inertial measurement unit of the rotorcraft.

Example 48 includes a method to control a rotorcraft to fly along a trajectory including calculating, by executing an instruction with at least one processor, output values for thrust, roll, pitch, and yaw control variables independent of one or more system parameters of the rotorcraft, determining, by executing an instruction with the at least one processor, motor speeds for a plurality of propeller motors of the rotorcraft based on the output values for the thrust, roll, pitch, and yaw control variables, the motor speeds being selected from a table of discrete motor speed values, and activating, via one or more motor controllers, the propeller motors of the rotorcraft based on the determined motor speeds.

Example 49 includes the method of Example 48, wherein the system parameters include at least one of a mass of the rotorcraft, moments of inertia of the rotorcraft, a drag coefficient of the propeller motors, a thrust coefficient of the propeller motors, or a distance between the propeller motors and a center of mass of the rotorcraft.

Example 50 includes the method of Example 49, wherein calculating the output values of the thrust, roll, pitch, and yaw control variables is independent of the mass of the rotorcraft, the moments of inertia of the rotorcraft, the drag coefficient of the propeller motors, the thrust coefficient of the propeller motors, and the distance between the propeller motors and the center of mass of the rotorcraft.

Example 51 includes a trajectory tracking controller including an altitude controller to calculate an output value of a thrust control variable based on a trajectory of a rotorcraft independent of one or more system parameters of the rotorcraft, an attitude controller to calculate output values of roll, pitch, and yaw control variables based on the trajectory independent of the one or more of the system parameters, and a motor speed selector to select speeds for propeller motors of the rotorcraft based on the output values of the thrust, roll, pitch, and yaw control variables and activate the propeller motors based on the selected motor speeds.

Example 52 includes the controller of Example 51, wherein the system parameters include at least one of a mass of the rotorcraft, moments of inertia of the rotorcraft, a drag coefficient of the propeller motors, a thrust coefficient of the propeller motors, or a distance between the propeller motors and a center of mass of the rotorcraft.

Example 53 includes the controller of Example 52, wherein the output values of the thrust, roll, pitch, and yaw control variables are calculated independent of the mass of the rotorcraft, the moments of inertia of the rotorcraft, the drag coefficient of the propeller motors, the thrust coefficient of the propeller motors, and the distance between the propeller motors and the center of mass of the rotorcraft.

Example 54 includes the controller of any of Examples 51-53, wherein the motor speed selector is to select the motor speeds from a table of a plurality of motor speed configurations, the motor speed configurations corresponding to different combinations of the output values of the thrust, roll, pitch, and yaw control variables.

Example 55 includes the controller of Example 54, wherein, for each of the motor speed configurations, each of the motor speeds is different.

Example 56 includes the controller of Example 54, wherein the motor speeds are selected from a plurality of discrete speed values for each of the propeller motors.

Example 57 includes the controller of Example 56, wherein the motor speeds are selected from eight discrete speed values for each of the propeller motors.

Example 58 includes the controller of any of Examples 51-53, wherein each of the thrust, roll, pitch, and yaw control variables are one of two output values.

Example 59 includes the controller of any of Examples 51-53, wherein the altitude controller and the attitude controller are to recalculate the output values for the thrust, roll, pitch, and yaw control variables, respectively, the motor speed selector is to select the motor speeds, and the motor controller is to activate the propeller motors at a frequency of at least about 500 Hertz (Hz).

Example 60 includes the controller of any of Examples 51-53, further including an orientation reference generator to determine a roll reference trajectory and a pitch reference trajectory to be performed to navigate the rotorcraft along the trajectory, the attitude controller is to calculate of the output value of the roll control variable based on the roll reference trajectory and calculate the output value of the pitch control variable based on the pitch reference trajectory.

Example 61 includes the controller of Example 60, wherein the attitude controller is to calculate the output value of the yaw control variable based on a yaw reference trajectory.

Example 62 includes the controller of Example 60, further including a position trajectory tracker to determine forces to be generated along x, y, z axes by the rotorcraft to follow the trajectory based on a current position of the rotorcraft and a desired position of the trajectory, the orientation reference generator is to determine the roll reference trajectory and the pitch reference trajectory based on the forces to be generated along the x, y, z axes.

Example 63 includes the controller of Example 62, wherein the altitude controller is to calculate the output value of the thrust control variable based on a z reference signal of the desired position of the trajectory.

Example 64 includes the controller of Example 62, further including a disturbance rejecter to determine one or more disturbance rejection control laws based on the current position of the rotorcraft and the desired position of the trajectory, the position trajectory tracker is to use the disturbance rejection control laws to eliminate disturbances from an inertial measurement unit of the rotorcraft.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A trajectory tracking controller comprising:
    an altitude controller to calculate an output value of a thrust control variable based on a trajectory of a rotorcraft independent of one or more system parameters of the rotorcraft;
    an attitude controller to calculate output values of roll, pitch, and yaw control variables based on the trajectory independent of the one or more of the system parameters; and
    a motor speed selector to select speeds for propeller motors of the rotorcraft based on the output values of the thrust, roll, pitch, and yaw control variables and activate the propeller motors based on the selected motor speeds, wherein, at a frequency of at least about 500 Hertz (Hz), the altitude controller is to recalculate the output value for the thrust control variable, the attitude controller is to recalculate the output values for the roll, pitch, and yaw control variables, and the motor speed selector is to select the motor speeds and activate the propeller motors.

2. The controller of claim 1, wherein the motor speed selector is to select the motor speeds from a table of a plurality of motor speed configurations, the motor speed configurations corresponding to different combinations of the output values of the thrust, roll, pitch, and yaw control variables.

3. The controller of claim 2, wherein, for each of the motor speed configurations, each of the motor speeds is different.

4. The controller of claim 2, wherein the motor speeds are selected from a plurality of discrete speed values for each of the propeller motors.

5. The controller of claim 4, wherein the motor speeds are selected from eight discrete speed values for each of the propeller motors.

6. The controller of claim 1, wherein each of the thrust, roll, pitch, and yaw control variables are one of two output values.

7. A trajectory tracking controller comprising:
    an altitude controller to calculate an output value of a thrust control variable based on a trajectory of a rotorcraft independent of one or more system parameters of the rotorcraft, the system parameters including at least one of a mass of the rotorcraft, moments of inertia of the rotorcraft, a drag coefficient of the propeller motors, a thrust coefficient of the propeller motors, or a distance between the propeller motors and a center of mass of the rotorcraft;
    an attitude controller to calculate output values of roll, pitch, and yaw control variables based on the trajectory independent of the one or more of the system parameters; and
    a motor speed selector to select speeds for propeller motors of the rotorcraft based on the output values of the thrust, roll, pitch, and yaw control variables and activate the propeller motors based on the selected motor speeds.

8. The controller of claim 7, wherein the output values of the thrust, roll, pitch, and yaw control variables are calculated independent of the mass of the rotorcraft, the moments of inertia of the rotorcraft, the drag coefficient of the propeller motors, the thrust coefficient of the propeller motors, and the distance between the propeller motors and the center of mass of the rotorcraft.

9. A non-transitory machine readable storage medium comprising instructions that, when executed, cause a machine to at least:
    calculate output values for thrust, roll, pitch, and yaw control variables based on a trajectory of a rotorcraft independent of one or more system parameters of the rotorcraft, the system parameters including at least one of a mass of the rotorcraft, moments of inertia of the rotorcraft, a drag coefficient of the propeller motors, a thrust coefficient of the propeller motors, or a distance between the propeller motors and a center of mass of the rotorcraft;
    select motor speeds for propeller motors of the rotorcraft based on the output values for the thrust, roll, pitch, and yaw control variables; and
    activate the propeller motors based on the selected motor speeds.

10. The non-transitory machine readable storage medium of claim 9, wherein the instructions, when executed, cause the machine to calculate the output values of the thrust, roll, pitch, and yaw control variables independent of the mass of the rotorcraft, the moments of inertia of the rotorcraft, the drag coefficient of the propeller motors, the thrust coefficient of the propeller motors, and the distance between the propeller motors and the center of mass of the rotorcraft.

11. The non-transitory machine readable storage medium of claim 9, wherein the instructions, when executed, further cause the machine to determine a roll reference trajectory and a pitch reference trajectory to be performed to navigate the rotorcraft along the trajectory, and wherein the calculation of the output value of the roll control variable is based on the roll reference trajectory and the calculation of the output value of the pitch control variable is based on the pitch reference trajectory.

12. The non-transitory machine readable storage medium of claim 11, wherein the instructions, when executed, cause the machine to calculate the output value of the yaw control variable based on a yaw reference trajectory.

13. The non-transitory machine readable storage medium of claim 11, wherein the instructions, when executed, further cause the machine to determine, based on a current position of the rotorcraft and a desired position of the trajectory, forces to be generated along x, y, z axes by the rotorcraft to follow the trajectory, and wherein the determination of the roll reference trajectory and the pitch reference trajectory are based on the forces to be generated along the x, y, z axes.

14. The non-transitory machine readable storage medium of claim 13, wherein the instructions, when executed, cause the machine to calculate the thrust control variable based on a z reference signal of the desired position of the trajectory.

15. The non-transitory machine readable storage medium of claim 13, wherein instructions, when executed, further cause the machine to determine, based on the current position of the rotorcraft and the desired position of the trajectory, one or more disturbance rejection control laws, and wherein the calculation of the forces to be generated along the x, y, z axes uses the disturbance rejection control laws to eliminate disturbances from an inertial measurement unit of the rotorcraft.

* * * * *